(12) United States Patent
Hoshi et al.

(10) Patent No.: US 11,734,298 B2
(45) Date of Patent: Aug. 22, 2023

(54) INFORMATION PROCESSING DEVICE, INFORMATION PROCESSING METHOD, AND GENERATING METHOD OF LEARNING MODEL

(71) Applicant: Kioxia Corporation, Tokyo (JP)

(72) Inventors: Yasuto Hoshi, Yokohama (JP); Daisuke Miyashita, Kawasaki (JP); Jun Deguchi, Kawasaki (JP)

(73) Assignee: Kioxia Corporation, Tokyo (JP)

( * ) Notice: Subject to any disclaimer, the term of this patent is extended or adjusted under 35 U.S.C. 154(b) by 231 days.

(21) Appl. No.: 17/304,190

(22) Filed: Jun. 16, 2021

(65) Prior Publication Data
US 2022/0309075 A1    Sep. 29, 2022

(30) Foreign Application Priority Data

Mar. 23, 2021 (JP) .................. 2021-048635

(51) Int. Cl.
| | | |
|---|---|---|
| G06F 16/25 | (2019.01) | |
| G06F 16/242 | (2019.01) | |
| G06F 16/245 | (2019.01) | |
| G06N 3/04 | (2023.01) | |
| G06N 3/045 | (2023.01) | |
| G06N 3/08 | (2023.01) | |
| G06N 3/048 | (2023.01) | |

(52) U.S. Cl.
CPC ......... *G06F 16/258* (2019.01); *G06F 16/243* (2019.01); *G06F 16/245* (2019.01); *G06N 3/045* (2023.01); *G06N 3/048* (2023.01); *G06N 3/08* (2013.01)

(58) Field of Classification Search
CPC .......... G06N 3/045; G06N 3/08; G06N 3/048; G06F 16/245; G06F 16/258; G06F 16/243
See application file for complete search history.

(56) References Cited

U.S. PATENT DOCUMENTS

| | | | |
|---|---|---|---|
| 10,747,761 B2 | 8/2020 | Zhong et al. | |
| 10,747,768 B2 | 8/2020 | Watanabe | |
| 10,956,810 B1 * | 3/2021 | Wright | .......... G06N 20/00 |
| 2021/0216818 A1 * | 7/2021 | Umeda | .......... G06T 7/00 |

FOREIGN PATENT DOCUMENTS

| | | |
|---|---|---|
| JP | 2020-004045 A | 1/2020 |
| JP | 2020-520516 A | 7/2020 |
| JP | 6772692 B2 | 10/2020 |

* cited by examiner

*Primary Examiner* — Etienne P Leroux
(74) *Attorney, Agent, or Firm* — Oblon, McClelland, Maier & Neustadt, L.L.P.

(57) ABSTRACT

According to one embodiment, an information processing device includes: an encoder including a first layer and a second layer which are coupled in series; and a decoder. The encoder is configured to: generate, based on first data, a first key and a first value in the first layer, and a second key and a second value in the second layer; and generate, based on second data different from the first data, a first query in the first layer, and a second query in the second layer. The decoder is configured to: generate third data which is included in the first data and is not included in the second data, based on the first key, the first value, the first query, the second key, the second value, and the second query.

20 Claims, 18 Drawing Sheets

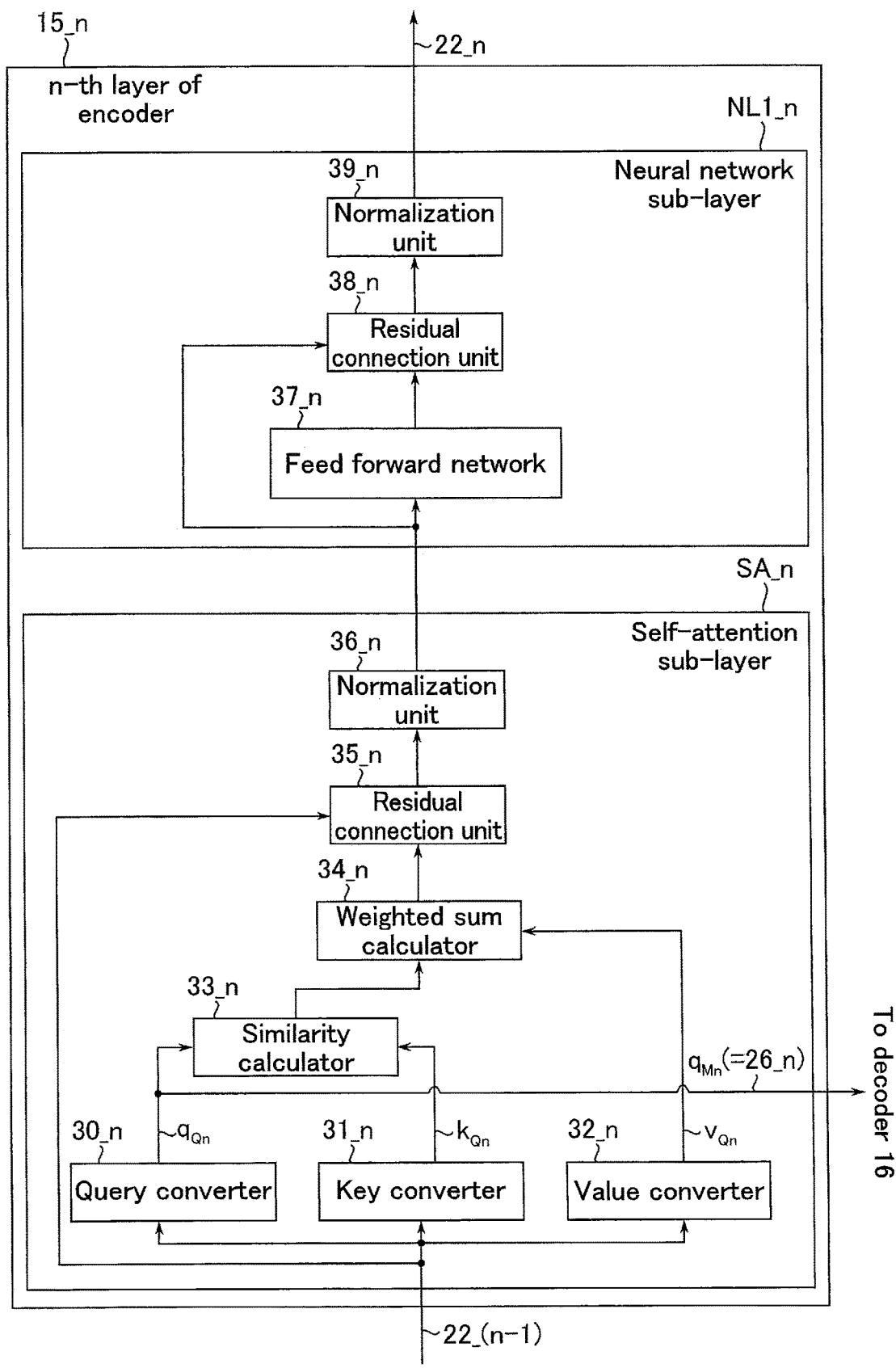
F I G. 6

| Number of loops | Question 22 and re-question 22R | Token corresponding to data 23_N | |
|---|---|---|---|
| First | Bernhard Fries was born in \<mask\> | He | ⎫ |
| Second | Bernhard Fries was born in He\<mask\> | idel | ⎬ S114;no |
| Third | Bernhard Fries was born in Heidel\<mask\> | berg | ⎪ |
| Fourth | Bernhard Fries was born in Heidelberg\<mask\> | (Period) | ⎭ |
| Fifth | Bernhard Fries was born in Heidelberg.\<mask\> | \</s\> | S114;yes |

F I G. 11

| Execution/non-execution of data augmentation process | Knowledge sources D and D' | Label |
|---|---|---|
| Case of non-execution | Nico Gardener (1908–1989) was a British international bridge player born in [Riga] Latvia (then part of Imperial Russia). | Riga |
| Case of execution | Nico Gardener (1908–1989) was a British international bridge player born in [ ] Latvia (then part of Imperial Russia). | Heidelberg, Lyon, Hawaii, ... |

Replace place name that matches with label with other place name at random

F I G. 13

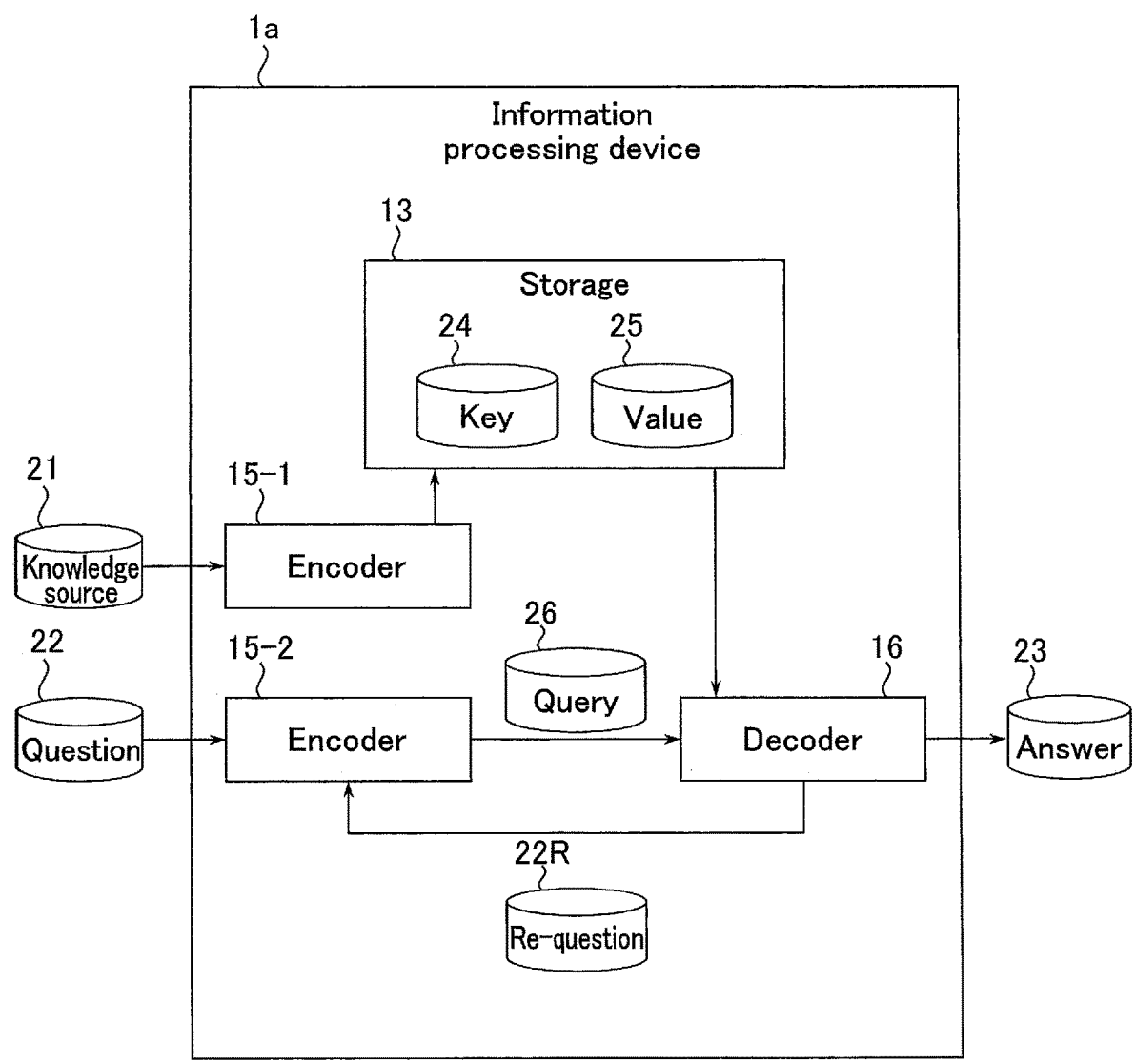
F I G. 15

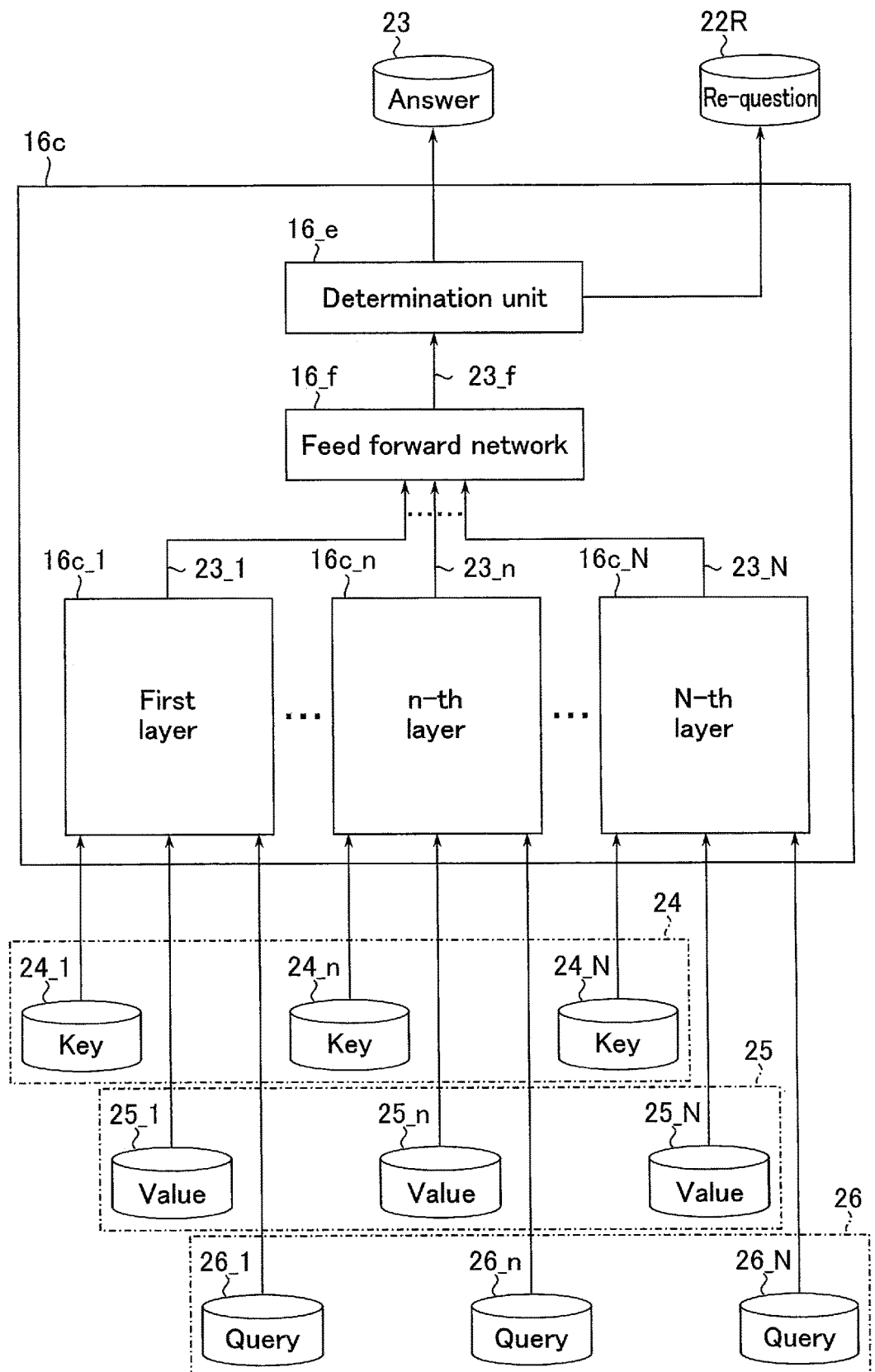
F I G. 19

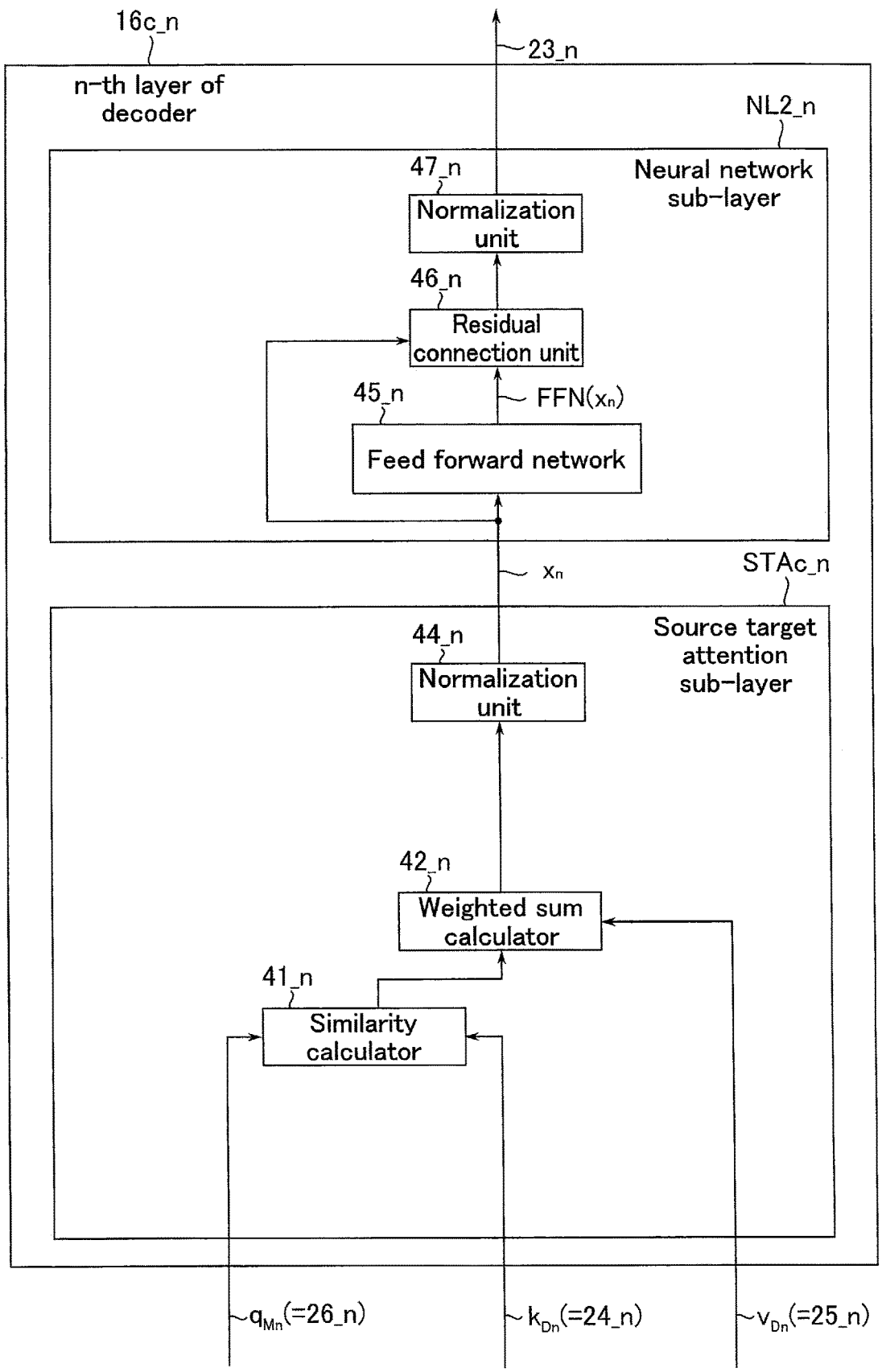
F I G. 20

INFORMATION PROCESSING DEVICE, INFORMATION PROCESSING METHOD, AND GENERATING METHOD OF LEARNING MODEL

CROSS-REFERENCE TO RELATED APPLICATIONS

This application is based upon and claims the benefit of priority from Japanese Patent Application No. 2021-048635, filed Mar. 23, 2021, the entire contents of which are incorporated herein by reference.

FIELD

Embodiments described herein relate generally to an information processing device, an information processing method, and a generating method of a learning model.

BACKGROUND

As a method of processing information of a natural language or the like, a language model is known. The language model is constructed, for example, by deep learning using a neural network, with a large volume of documents being input in the deep learning. The language model obtained by the deep learning may include knowledge included in the large volume of documents used at the time of training.

BRIEF DESCRIPTION OF THE DRAWINGS

FIG. 6 is a block diagram illustrating an example of a configuration of a question processing function of an n-th layer of the encoder according to the embodiment.

FIG. 11 is a diagram illustrating a determination process in the information processing device according to the embodiment.

FIG. 13 is a diagram illustrating an example of training data used by a data augmentation process in the information processing device according to the embodiment.

FIG. 15 is a block diagram illustrating an example of an outline of a functional configuration of an information processing device according to a first modification.

FIG. 19 is a block diagram illustrating an example of a functional configuration of a decoder according to a fourth modification.

FIG. 20 is a block diagram illustrating an example of a functional configuration of an n-th layer of the decoder according to the fourth modification.

DETAILED DESCRIPTION

In general, according to one embodiment, an information processing device includes an encoder including a first layer and a second layer which are coupled in series; and a decoder. The encoder is configured to: generate, based on first data, a first key and a first value in the first layer, and a second key and a second value in the second layer; and generate, based on second data different from the first data, a first query in the first layer, and a second query in the second layer. The decoder is configured to: generate third data which is included in the first data and is not included in the second data, based on the first key, the first value, the first query, the second key, the second value, and the second query.

Hereinafter, embodiments will be described with reference to the accompanying drawings. In the description, structural elements having substantially identical functions and configurations are denoted by identical reference signs. In addition, the embodiments to be described below exemplarily illustrate technical concepts. Various changes can be made to the embodiments.

1. Embodiments

1.1 Configuration

To begin with, a configuration of an embodiment will be described.

1.1.1 Information Processing Device

Figure 1:
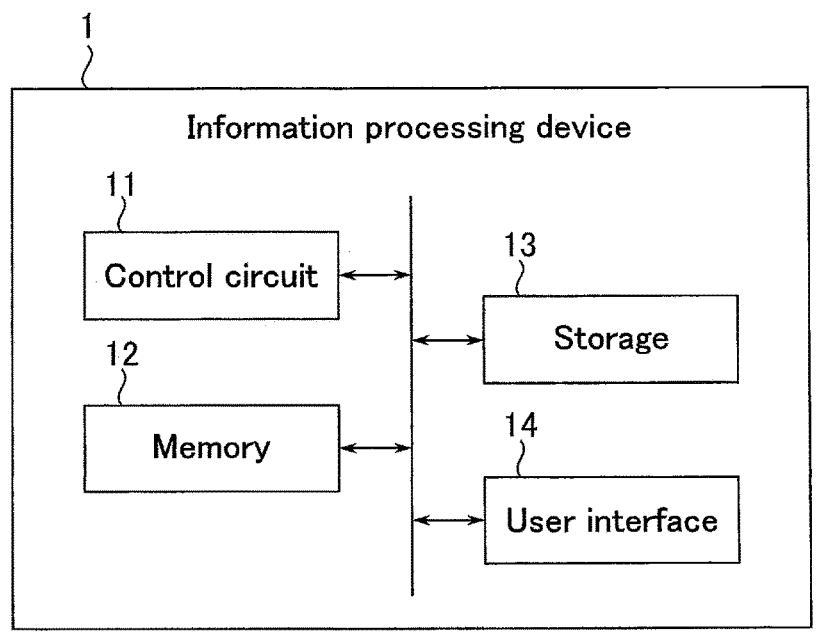
FIG. 1 is a block diagram illustrating an example of a hardware configuration of an information processing device according to an embodiment.

FIG. 1 is a block diagram illustrating an example of a hardware configuration of an information processing device according to an embodiment. An information processing device 1 is a device which converts information of a natural language or the like to data, and processes the data. The information processing device 1 is, for example, a personal computer or a smartphone. The information processing device 1 includes a control circuit 11, a memory 12, a storage 13, and a user interface 14.

The control circuit 11 is a circuit which controls an entirety of the information processing device 1. The control circuit 11 includes a CPU (Central Processing Unit), a ROM (Read Only Memory), and a RAM (Random Access Memory). The control circuit 11 may include a GPU (Graphics Processing Unit). Responding to a request from a user on the outside, the control circuit 11 loads programs, which are stored in the ROM, into the RAM, thereby executing various operations. The various operations include, for example, a training operation based on a knowledge source, and an inference operation of inferring an answer to a question.

The memory 12 is a main memory of the information processing device 1. The memory 12 is, for example, a DRAM (Dynamic Random Access Memory). The memory 12 temporarily stores data relating to various operations which the control circuit 11 executes.

The storage 13 is a storage device of the information processing device 1. The storage 13 is, for example, an SSD (Solid State Drive) or an HDD (Hard Disk Drive). The SSD may include a NAND flash memory. The storage 13 non-volatilely stores data relating to various operations which the control circuit 11 executes.

The user interface 14 is an equipment which manages communications between the user and the control circuit 11. The user interface 14 includes an input equipment and an output equipment. The input equipment includes, for example, a touch panel, a keyboard, an operation button and the like. The output equipment includes, for example, a display or a printer. The user interface 14 inputs to the control circuit 11 requests for execution of various operations from the user via the input equipment. The user interface 14 provides results of execution of various operations to the user via the output equipment.

Figure 2:
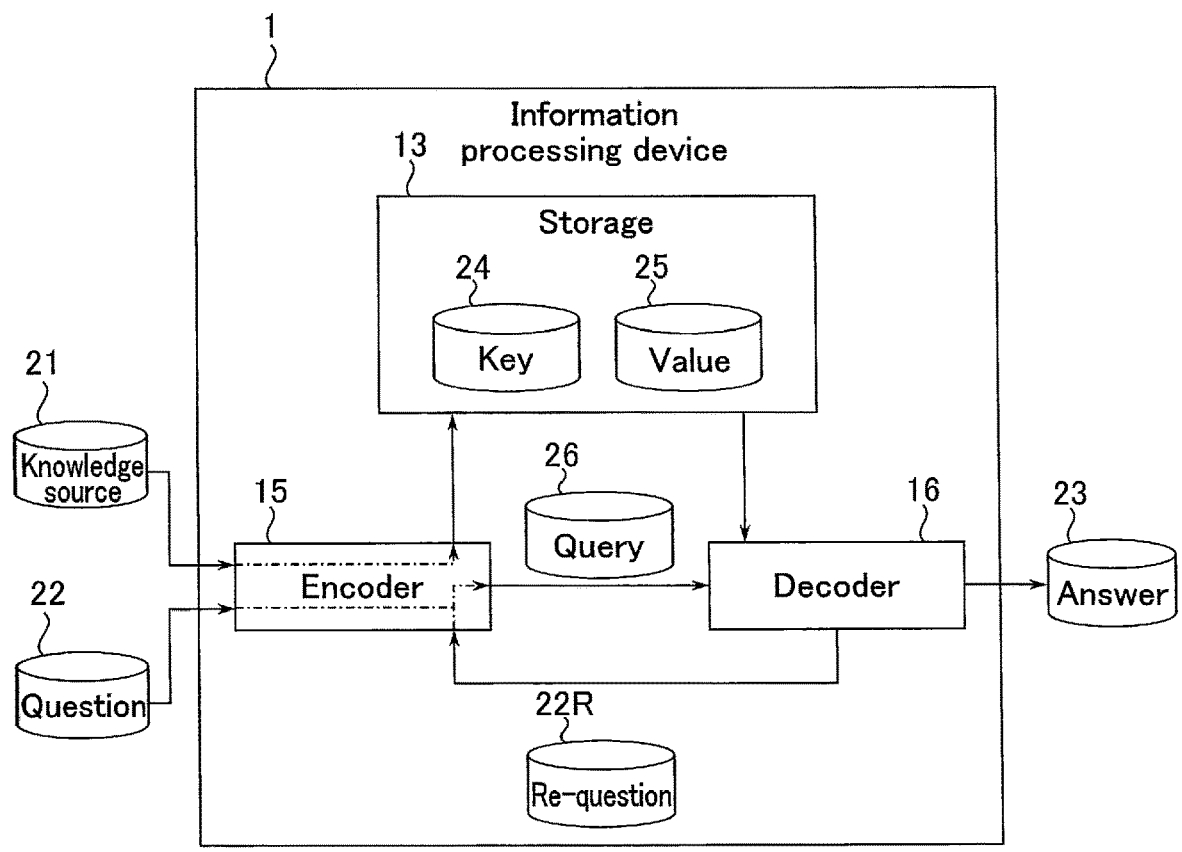
FIG. 2 is a block diagram illustrating an example of an outline of a functional configuration of the information processing device according to the embodiment.

FIG. 2 is a block diagram illustrating an example of an outline of a functional configuration of the information processing device according to the embodiment. As illustrated in FIG. 2, the information processing device 1 includes functions as an encoder 15 and a decoder 16. The encoder 15 and decoder 16 are realized by the control circuit 11 executing operations based on programs with use of the memory 12. Thereby, the information processing device 1 is configured to output an answer 23 to an input question 22, based on a knowledge source 21. In addition, the information processing device 1 is configured to generate a re-question 22R as an intermediate product. The encoder 15 and decoder 16 are realized by using a neural network including a plurality of layers.

The knowledge source 21, question 22, re-question 22R and answer 23 correspond to a natural language including one or more sentences. The sentence includes one or more words. The word includes one or more sub-words. The sub-word corresponds to a token. The token is a unit of data at a time of treating the natural language as data.

The knowledge source 21 includes information for deriving answers 23 from the question 22 and re-question 22R. The knowledge source 21 may also include information which is not necessary for deriving the answers 23 from the question 22 and re-question 22R. The question 22 and re-question 22R are, for example, sentences including masked parts at the ends of the sentences. The masked part includes one or more sub-words. The answer 23 is a sentence in which the masked part in the question 22 is replaced with one or more tokens which are correct.

The encoder 15 is a language model which converts an input natural language to a vector corresponding to a context in units of a token. The encoder 15 generates a key 24 and a value 25, based on the knowledge source 21. The encoder 15 correlates, and stores into the storage 13, the generated key 24 and value 25. The key 24 is data for identifying the value 25. The value 25 is data representative of a sub-word included in the knowledge source 21. The key 24 and value 25 are correlated in a one-to-one correspondence.

In addition, the encoder 15 generates a query 26, based on the question 22 or re-question 22R. The encoder 15 transmits the generated query 26 to the decoder 16. The query 26 is data for searching the key 24.

The decoder 16 generates a new natural language corresponding to the token, based on the output from the encoder 15. The decoder 16 generates the re-question 22R and answer 23, based on the key 24 and value 25 in the storage 13, and the query 26 from the encoder 15. The decoder 16 transmits the re-question 22R to the encoder 15. The decoder 16 outputs the answer 23.

1.1.2 Encoder

Next, a configuration of the encoder 15 according to the embodiment will be described. Hereinafter, functional configurations of the encoder 15 will be described, separately, with respect to a case of processing the knowledge source 21 and with respect to a case of processing the question 22 or re-question 22R.

(Knowledge Source Processing Function)

To begin with, the functional configuration of the encoder 15 in the case of processing the knowledge source 21 will be described.

Figure 3:
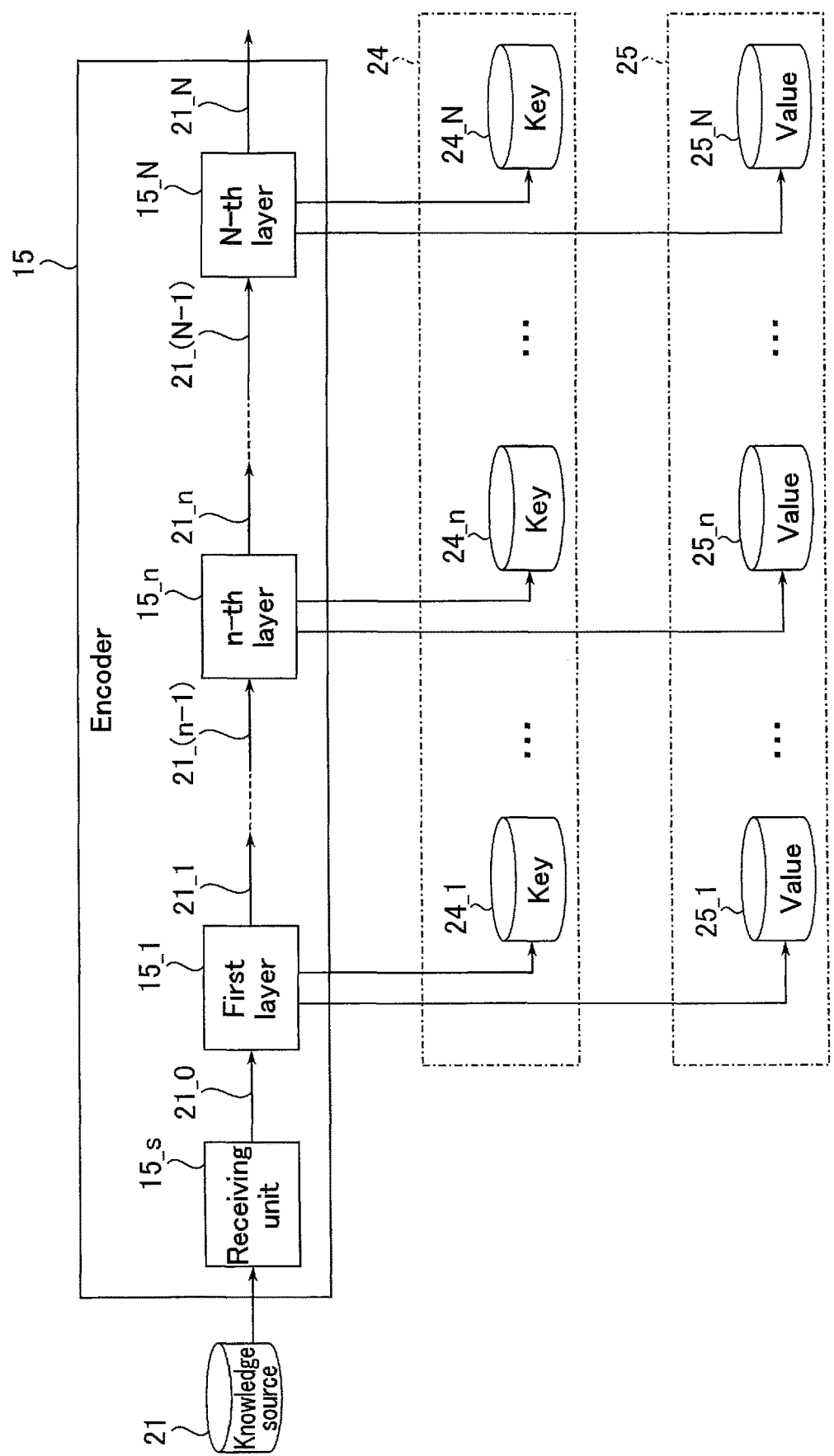
FIG. 3 is a block diagram illustrating an example of a configuration of a knowledge source processing function of an encoder according to the embodiment.

FIG. 3 is a block diagram illustrating an example of a knowledge source processing functional configuration of the encoder according to the embodiment. As illustrated in FIG. 3, the encoder 15 includes a receiving unit 15_s, and an N-number of layers (a first layer 15_1, . . . , an n-th layer 15_n, . . . , an N-th layer 15_N) (N is an integer of 3 or more, and $n$ is an integer which is greater than 1 and less than N). The receiving unit 15_s and the N layers 15_1 to 15_N are connected in series. The key 24 includes a key 24_1, . . . , 24_n, . . . , 24N. The value 25 includes values 25_1, . . . , 25_n, . . . , 25_N.

Upon receiving the knowledge source 21, the receiving unit 15_s generates data 21_0, based on the knowledge source 21. When the number of tokens of the knowledge source 21 is $L_D$, the data 21_0 is a multidimensional array in which an $L_D$ number of d-dimensional vectors are arranged ($L_D$ and d are natural numbers). The receiving unit 15_s sends the data 21_0 to the first layer 15_1 of the encoder 15. Note that in the description below, in some cases, a size of the data 21_0 is expressed as $[L_D, d]$.

The first layer 15_1 generates data 21_1, based on the data 21_0. The data 21_1 has a size of $[L_D, d]$. In addition, the first layer 15_1 generates a key 24_1 and a value 25_1 as intermediate products. Each of the key 24_1 and value 25_1 has a size of $[L_D, d]$. The first layer 15-1 outputs the data 21_1, key 24_1 and value 25_1.

The $n$-th layer 15_n of the encoder 15 generates data 21_n, based on data 21_(n−1). Each of the data 21_(n−1) and data 21_n has a size of $[L_D, d]$. In addition, the $n$-th layer 15_n generates a key 24_n and value 25_n as intermediate products. Each of the key 24_n and value 25_n has a size of $[L_D, d]$. The $n$-th layer 15-n outputs the data 21_n, key 24_n and value 25n. The description relating to the $n$-th layer 15_n of the encoder 15 holds true for all (N-2) layers coupled in series between the first layer 15_1 and the N-th layer 15_N of the encoder 15.

The N-th layer 15_N generates data 21_N, based on data 21_(N-1). Each of the data 21_(N-1) and data 21_N has a size of [$L_D$, d]. In addition, the N-th layer 15_N generates a key 24_N and value 25_N as intermediate products. Each of the key 24_N and value 25_N has a size of [$L_D$, d]. The N-th layer 15-N outputs the data 21_N, key 24_N and value 25_N.

By the above configuration, the N layers 15_1 to 15_N in the encoder 15 generate an N-number of pairs 24_1 and 25_1 through 24_N and 25_N of the keys and values, based on the knowledge source 21.

Note that the N layers 15_1 to 15_N in the encoder 15 have the same configurations. Hereinafter, the configuration of the $n$-th layer 15_$n$, which represents the N layers 15_1 to 15_N, will be described. A description of the other (N-1) layers 15_1 to 15_(n-1), and 15_(n+1) to 15_N is omitted.

Figure 4:
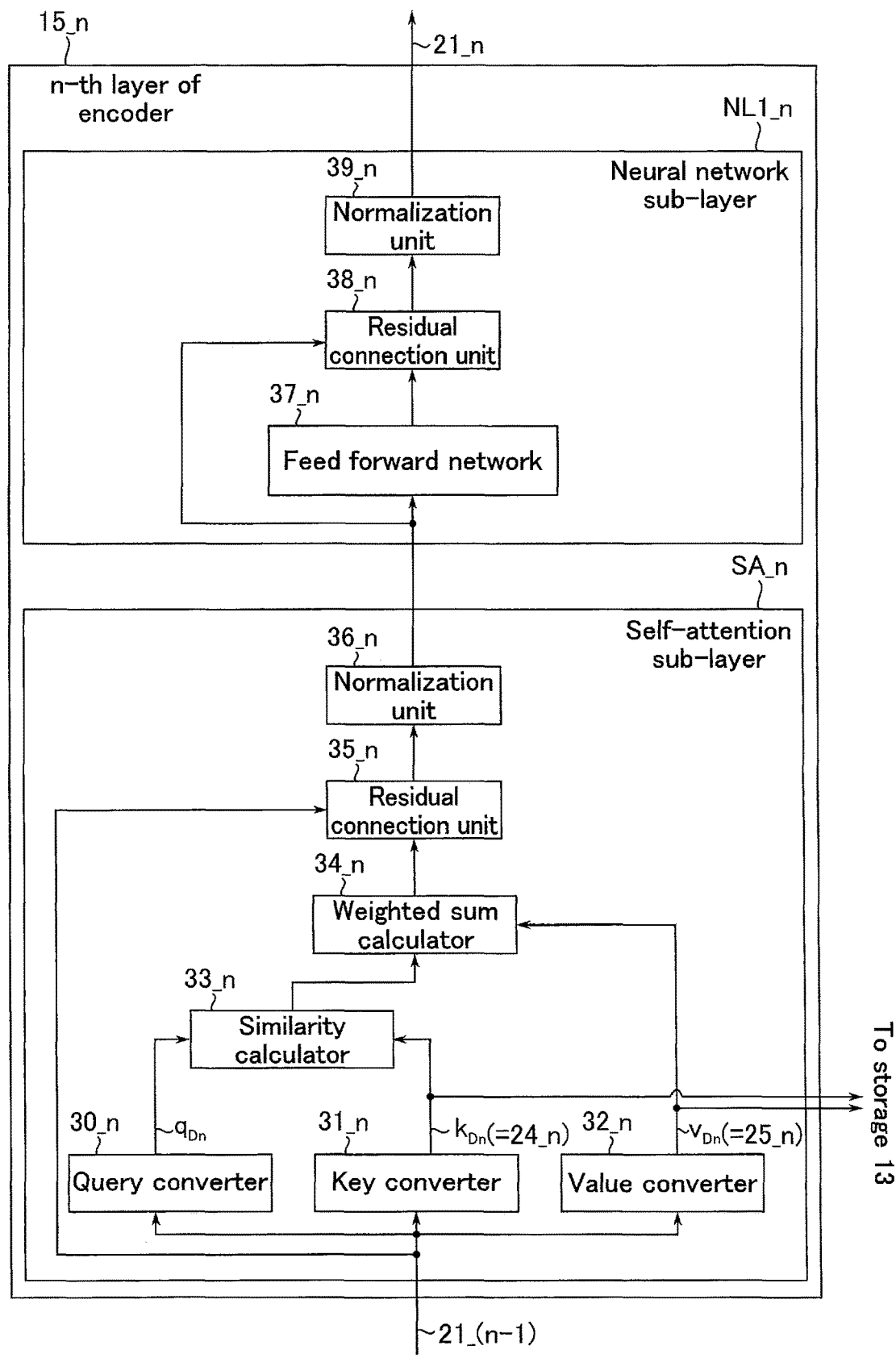
FIG. 4 is a block diagram illustrating an example of a configuration of a knowledge source processing function of an n-th layer of the encoder according to the embodiment.

FIG. 4 is a block diagram illustrating an example of a configuration of a knowledge source processing function of the $n$-th layer of the encoder according to the embodiment. As illustrated in FIG. 4, the $n$-th layer 15_$n$ of the encoder 15 includes a self-attention sub-layer SA_$n$ and a neural network sub-layer NL1_$n$. The self-attention sub-layer SA_$n$ includes a query converter 30_$n$, a key converter 31_$n$, a value converter 32_$n$, a similarity calculator 33_$n$, a weighted sum calculator 34_$n$, a residual connection unit 35_$n$, and a normalization unit 36_$n$. The neural network sub-layer NL1_$n$ includes a feed-forward network 37_$n$, a residual connection unit 38_$n$, and a normalization unit 39_$n$.

The query converter 30_$n$ generates a query $q_{Dn}$, based on the data 21_(n-1). The query $q_{Dn}$ has a size of [$L_D$, d]. The query converter 30_$n$ sends the query $q_{Dn}$ to the similarity calculator 33_$n$.

The key converter 31_$n$ generates a key $k_{Dn}$, based on the data 21_(n-1). The key $k_{Dn}$ has a size of [$L_D$, d]. The key $k_{Dn}$ is equal to the key 24_$n$. The key converter 31_$n$ sends the key $k_{Dn}$ to the similarity calculator 33_$n$ and the storage 13.

The value converter 32_$n$ generates a value $v_{Dn}$, based on the data 21_(n-1). The value $v_{Dn}$ has a size of [$L_D$, d]. The value $v_{Dn}$ is equal to the value 25_$n$. The value converter 32_$n$ sends the value $v_{Dn}$, to the weighted sum calculator 34_$n$ and the storage 13. The storage 13 correlates and stores the key $k_{Dn}$ and the value $v_{Dn}$.

The similarity calculator 33_$n$ executes a similarity operation, based on the query $q_{Dn}$ and key $k_{Dn}$. The similarity operation is an operation for computing an attention weight. The similarity operation is, for example, a dot-product process. The computed attention weight is sent to the weighted sum calculator 34_$n$.

The weighted sum calculator 34_$n$ executes a weighted sum operation, based on the value $v_{Dn}$ and the attention weight. By the weighted sum operation, an element of the value $v_{Dn}$, which corresponds to the key $k_{Dn}$ that is similar to the query $q_{Dn}$, is extracted. An output from the weighted sum calculator 34_$n$ is sent to the residual connection unit 35_$n$.

Note that the similarity operation and the weighted sum operation are also called "attention operation". An attention operation in the $n$-th layer 15_$n$ in the case of processing the knowledge source 21 is expressed by an equation (1) below.

$$\text{Attention}(q_{Dn}, k_{Dn}, v_{Dn}) = \text{Softmax}(q_{Dn} \cdot k_{Dn}^T / \sqrt{d}) \cdot v_{Dn} \quad (1)$$

The $n$-th layer 15_$n$ generates the query $q_{Dn}$, key $k_{Dn}$ and value $v_{Dn}$ from the identical knowledge source 21. Thus, in the case of processing the knowledge source 21, the attention operation in the $n$-th layer 15_$n$ is a self-attention which is based on the knowledge source 21 and not based on the question 22.

The residual connection unit 35_$n$ executes a residual connection by adding the data 21_(n-1) to the output from the weighted sum calculator 34_$n$. The residual connection is a process of converting an output (e.g. Attention ($q_{Dn}$, $k_{Dn}$, $v_{Dn}$) from a target structural element to a desired output, based on an input (e.g. data 21_(n-1)) to the target structural element. The residual connection is executed when the target structural element is configured to output a desired output residual in relation to the input to the target structural element.

The normalization unit 36_$n$ executes a layer normalization on an output from the residual connection unit 35_$n$. An output from the normalization unit 36_$n$ becomes an output from the self-attention sub-layer SA_$n$.

The feed-forward network 37_$n$ executes a multiply-accumulate operation on the output from the self-attention sub-layer SA_$n$, by using a weight tensor and a bias term. The weight tensor and bias term are parameters for determining characteristics of the $n$-th layer 15_$n$ of the encoder 15. In the present embodiment, it is assumed that the weight tensor and bias term in every feed-forward network in the encoder 15 are fixed values, even when a training operation, an inference preparation operation and an inference operation which will be described below.

The residual connection unit 38_$n$ executes a residual connection by adding the output from the self-attention sub-layer SA_$n$ to an output from the feed-forward network 37_$n$.

The normalization unit 39_$n$ executes a layer normalization on an output from the residual connection unit 38_$n$. An output from the normalization unit 39_$n$ becomes an output from the neural network sub-layer NL1_$n$. The output of the neural network sub-layer NL1_$n$ is sent as data 21_$n$ to an (n+1)-th layer 15_(n+1) of the encoder 15.

By the above, the $n$-th layer 15_$n$ of the encoder 15 generates the data 21_$n$, based on the data 21_(n-1), and sends the data 21_$n$ to the (n+1)-th layer 15_(n+1) of the encoder 15.

(Question Processing Function)

Next, a functional configuration of the encoder 15 in the case of processing the question 22 and re-question 22R will be described.

Figure 5:
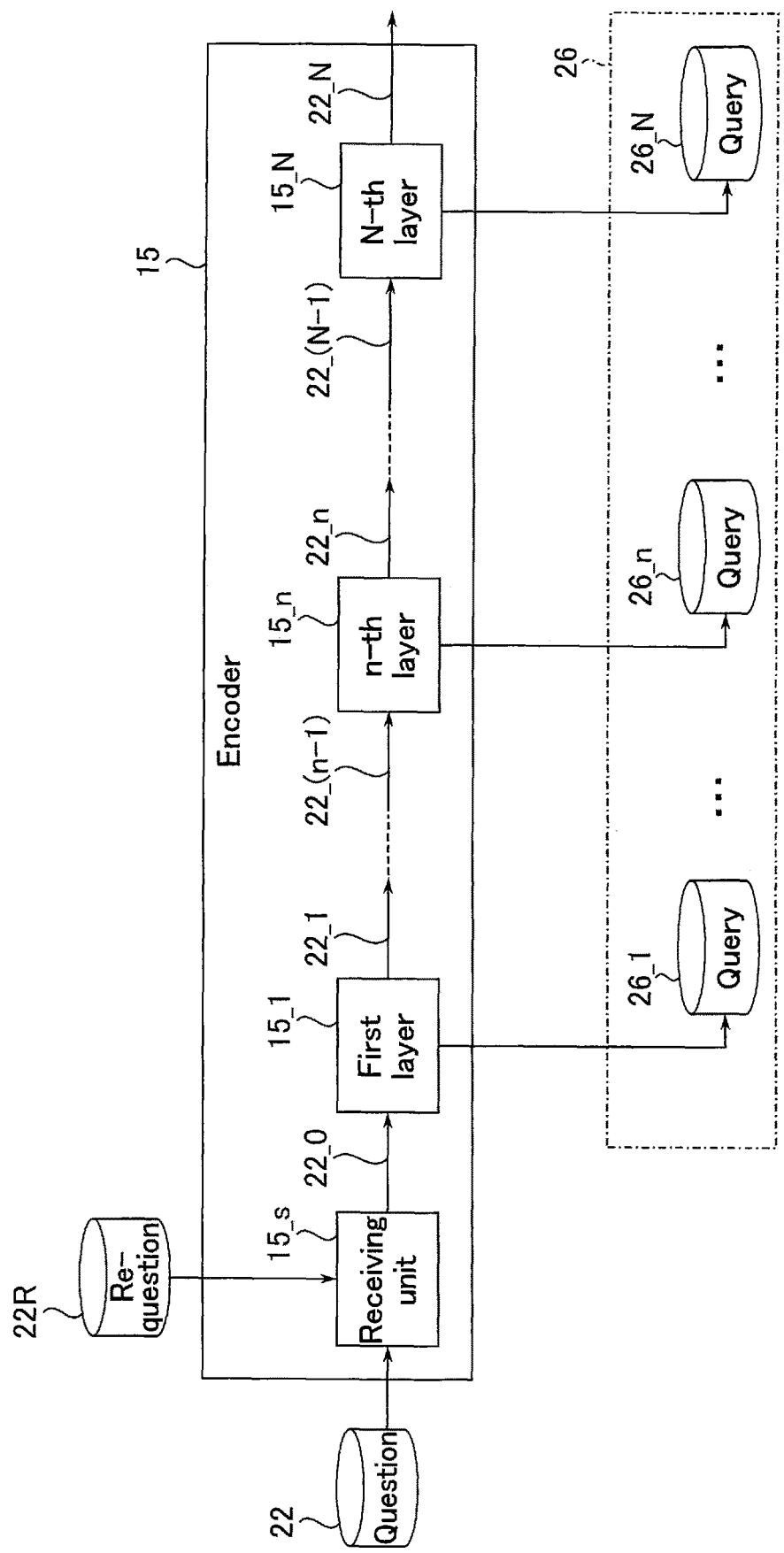
FIG. 5 is a block diagram illustrating an example of a configuration of a question processing function of the encoder according to the embodiment.

FIG. 5 is a block diagram illustrating an example of a question processing functional configuration of the encoder according to the embodiment. FIG. 5 corresponds to FIG. 3. As illustrated in FIG. 5, in the case of processing the question 22 and re-question 22R, like the case of processing the knowledge source 21, the encoder 15 includes a receiving unit 15_$s$, and an N-number of layers 15_1 to 15_N. In addition, the query 26 includes queries 26_1, ..., 26_$n$, ..., 26_N.

Upon receiving the question 22 or re-question 22R, the receiving unit 15_$s$ generates data 22_0, based on the question 22 or re-question 22R. When the receiving unit 15_$s$ has received the question 22, the receiving unit 15_$s$ converts the question 22 to data 22_0 of a d-dimensional vector form in units of a token. A masked part in the question 22 is converted to one special token <mask>. When the receiving unit 15_$s$ has received the re-question 22R, the receiving unit 15_$s$ outputs the re-question 22R as data 22_0.

When the number of tokens in the question 22 and re-question 22R is $L_Q$, the data 22_0 is a multidimensional array in which an $L_Q$ number of d-dimensional vectors are arranged ($L_Q$ is a natural number less than $L_D$). Specifically, the data 22_0 generated based on the question 22 and re-question 22R has a size of [$L_Q$, d]. The receiving unit 15_s sends the data 22_0 to the first layer 15_1 of the encoder 15.

The first layer 15_1 generates data 22_1, based on the data 22_0. The data 22_1 has a size of [$L_Q$, d]. In addition, the first layer 15_1 generates the query 26_1 as an intermediate product. The query 26_1 has a size of [1, d]. The query 26_1 is a d-dimensional vector corresponding to the special token <mask>. The first layer 15-1 outputs the data 22_1 and query 26_1.

The n-th layer 15_n of the encoder 15 generates data 22_n, based on data 22_(n−1). Each of the data 22_(n−1) and the data 22_n has a size of [$L_Q$, d]. In addition, the n-th layer 15_n generates the query 26_n as an intermediate product. The query 26_n has a size of [1, d]. The query 26_n is a d-dimensional vector corresponding to the special token <mask>. The n-th layer 15-n outputs the data 22_n and query 26_n. The description relating to the n-th layer 15_n of the encoder 15 holds true for all (N-2) layers coupled in series between the first layer 15_1 and the N-th layer 15_N of the encoder 15.

The N-th layer 15_N generates data 22_N, based on data 22_(N-1). Each of the data 22_(N-1) and the data 22N has a size of [$L_Q$, d]. In addition, the N-th layer 15_N generates the query 26_N as an intermediate product. The query 26_N has a size of [1, d]. The query 26_N is a d-dimensional vector corresponding to the special token <mask>. The N-th layer 15-N outputs the data 22_N and query 26_N.

By the above-described configuration, the N layers 15_1 to 15_N in the encoder 15 generate the N queries 26_1 to 26_N, based on the question 22 and re-question 22R.

FIG. 6 is a block diagram illustrating an example of a configuration of the question processing function of the n-th layer of the encoder according to the embodiment. FIG. 6 corresponds to FIG. 4. In FIG. 6, like FIG. 4, a configuration of the n-th layer 15_n, which represents the N layers 15_1 to 15_N, will be described.

The query converter 30_n generates a query $q_{Qn}$ of a size of [$L_Q$, d], based on the data 22_(n−1). The query converter 30_n sends the query $q_{Qn}$ to the similarity calculator 33_n. In addition, the query converter 30_n sends a query $q_{Mn}$ (=query 26_n) of that part of the query $q_{Qn}$, which corresponds to the special token <mask>, to the decoder 16.

The key converter 31_n generates a key $k_{Qn}$ of a size of [$L_Q$, d], based on the data 22_(n−1). The key converter 31_n sends the key $k_{Qn}$ to the similarity calculator 33_n.

The value converter 32_n generates a value $v_{Qn}$ of a size of [$L_Q$, d], based on the data 22_(n−1). The value converter 32_n sends the value $v_{Qn}$ to the weighted sum calculator 34_n.

The similarity calculator 33_n executes a similarity operation, based on the query $q_{Qn}$ and key $k_{Qn}$. An attention weight computed by the similarity operation is sent to the weighted sum calculator 34_n.

The weighted sum calculator 34_n executes a weighted sum operation, based on the value $v_{Qn}$ and the attention weight received from the similarity calculator 33_n. By the weighted sum operation, an element of the value $v_{Qn}$, which corresponds to the key $k_{Qn}$ that is similar to the query $q_{Qn}$, is extracted. An output from the weighted sum calculator 34_n is sent to the residual connection unit 35_n.

Note that an attention operation in the n-th layer 15_n of the encoder 15 in the case of processing the question 22 and re-question 22R is expressed by an equation (2) below.

$$\text{Attention}(q_{Qn}, k_{Qn}, v_{Qn}) = \text{Softmax}(q_{Qn} \cdot k_{Qn}^T / \sqrt{d}) \cdot v_{Qn} \quad (2)$$

The n-th layer 15_n generates the query $q_{Qn}$, key $k_{Qn}$ and value $v_{Qn}$ from the identical question 22 or re-question 22R. Thus, in the case of processing the question 22 or re-question 22R, the attention operation in the n-th layer 15_n is a self-attention which is based on the question 22 and re-question 22R and is not based on the knowledge source 21.

The residual connection unit 35_n executes a residual connection by adding the output from the weighted sum calculator 34_n to the data 22_(n−1).

The normalization unit 36_n executes a layer normalization on an output from the residual connection unit 35_n. An output from the normalization unit 36_n becomes an output from the self-attention sub-layer SA_n.

The functional configuration of the neural network sub-layer NL1_n is the same as in the case of processing the knowledge source 21. Specifically, the weight tensor and the bias term of the feed-forward network 37_n are the same as in the case of processing the knowledge source 21.

By the above, the n-th layer 15_n of the encoder 15 generates the data 22_n, based on the data 22_(n−1), and sends the data 22_n to the (n+1)-th layer 15_(n+1) of the encoder 15.

1.1.3 Decoder

Next, a configuration of the decoder 16 according the embodiment will be described.

Figure 7:
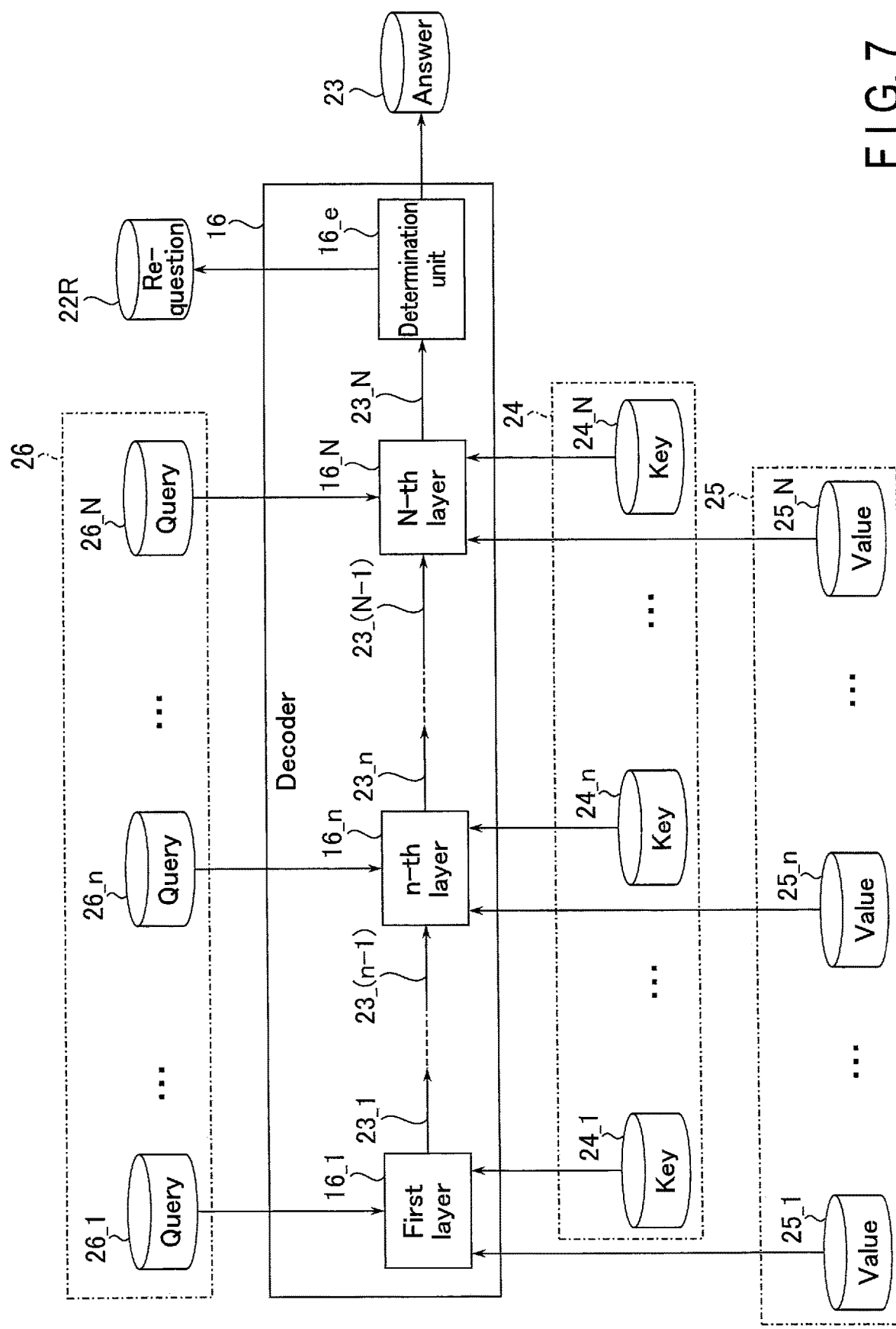
FIG. 7 is a block diagram illustrating an example of a functional configuration of a decoder according to the embodiment.

FIG. 7 is a block diagram illustrating an example of a functional configuration of the decoder according to the embodiment. As illustrated in FIG. 7, the decoder 16 includes an N-number of layers (a first layer 16_1, . . . , an n-th layer 16_n, . . . , an N-th layer 16_N), and a determination unit 16_e. The N layers 16_1 to 16_N and the determination unit 16_e are coupled in series.

The first layer 16_1 of the decoder 16 generates data 23_1, based on the key 24_1, value 25_1 and query 26_1. The data 23_1 has a size of [1, d]. The data 23_1 is a d-dimensional vector corresponding to one token. The first layer 16_1 sends the generated data 23_1 to the second layer 16_2 of the decoder 16.

Upon receiving data 23_(n−1) from the (n−1)th layer 16_(n−1) of the decoder 16, the n-th layer 16_n of the decoder 16 generates data 23_n, based on the data 23_(n−1), key 24_n, value 25_n and query 26_n. Each of the data 23_(n−1) and the data 23_n has a size of [1, d]. The data 23_n is a d-dimensional vector corresponding to one token. The n-th layer 16_n sends the generated data 23_n to an (n+1)-th layer 16_(n+1) of the decoder 16. The description relating to the n-th layer 16_n of the decoder 16 holds true for all (N-2) layers coupled in series between the first layer 16_1 and the N-th layer 16_N of the decoder 16.

The N-th layer 16_N generates data 23_N, based on the data 23_(N-1), key 24_N, value 25_N and query 26_N. Each of the data 23_(N-1) and the data 23_N has a size of [1, d]. The data 23_N is a d-dimensional vector corresponding to one token. The N-th layer 16_N sends the generated data 23_N to the determination unit 16_e.

Based on the data 23_N, the determination unit 16e determines whether or not a process for generating the answer 23 is completed. When the determination unit 16_e determines that the process for generating the answer 23 is not completed, the determination unit 16_e generates the re-question 22R. When the determination unit 16_e determines that the process for generating the answer 23 is completed, the determination unit 16_e generates the answer 23. The determination process of the determination unit 16_e will be described later.

By the above configuration, the N layers 16_1 to 16_N in the decoder 16 generate the data 23_1 to 23_N, based on at least a set including the key 24_1, value 25_1 and query 26-1 through a set including the key 24_N, value 25_N and query 26_N.

Note that the N layers 16_1 to 16_N in the decoder 16 have the same configuration. Hereinafter, the configuration of the n-th layer 16_n, which represents the N layers 16_1 to 16_N, will be described. A description of the other (N-1) layers 16_1 to 16_(n−1), and 16_(n+1) to 16_N is omitted.

Figure 8:
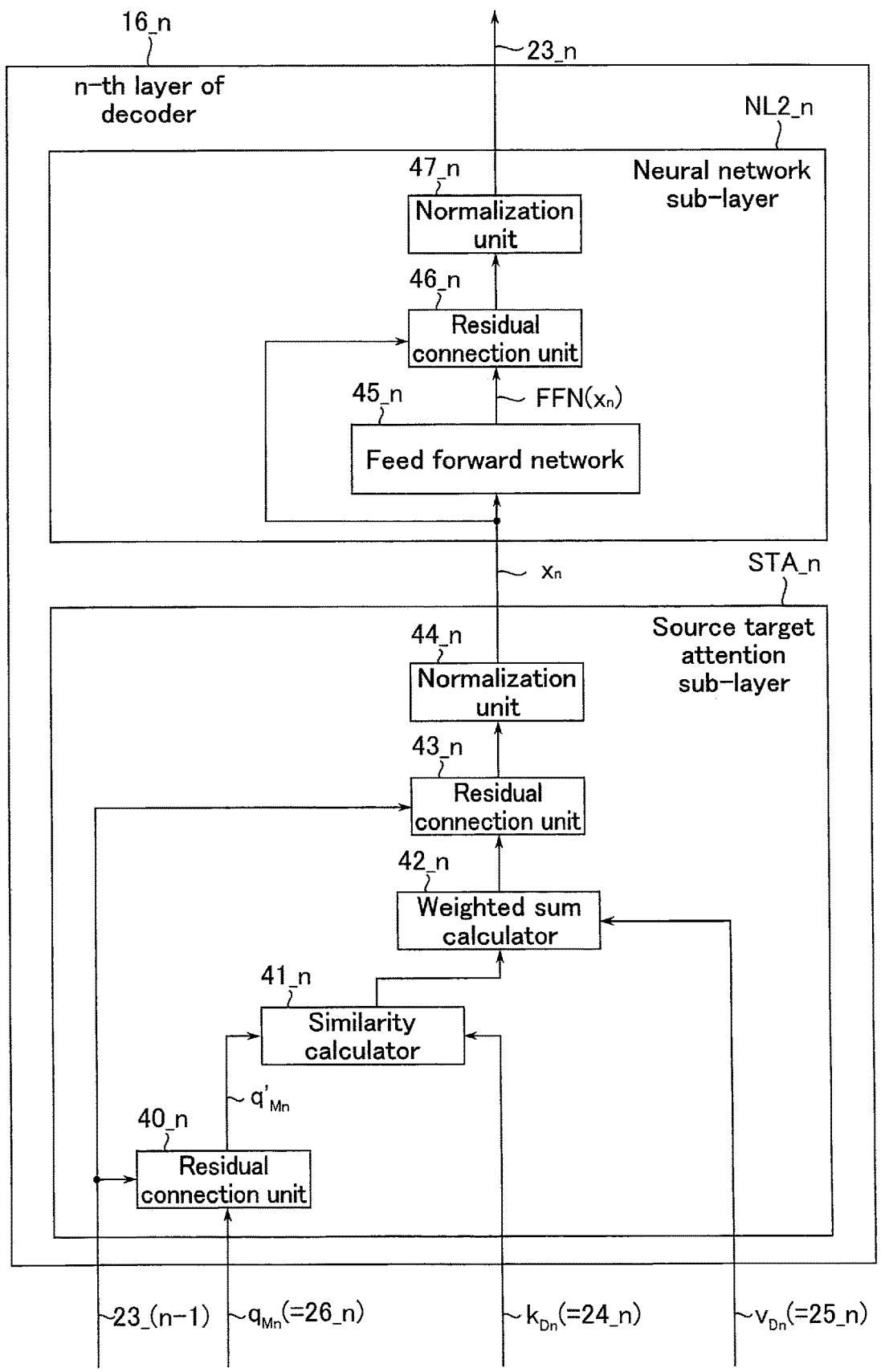
FIG. 8 is a block diagram illustrating an example of a functional configuration of an n-th layer of the decoder according to the embodiment.

FIG. 8 is a block diagram illustrating an example of a functional configuration of the n-th layer of the decoder according to the embodiment. As illustrated in FIG. 8, the n-th layer 16_n of the decoder 16 includes a source-target attention sub-layer STA_n and a neural network sub-layer NL2_n. The source-target attention sub-layer STA_n includes a residual connection unit 40_n, a similarity calculator 41_n, a weighted sum calculator 42_n, a residual connection unit 43_n, and a normalization unit 44_n. The neural network sub-layer NL2_n includes a feed-forward network 45_n, a residual connection unit 46_n, and a normalization unit 47_n.

The residual connection unit 40_n adds data 23_(n−1), which is an output from the (n−1)-th layer 16_(n−1) of the decoder 16, to a query $q_{Mn}$ (=query 26_n), and obtains a query $q'_{Mn}$. The data 23_(n−1) means a hidden state which is transmitted from the (n−1)-th layer 16_(n−1). Note that a residual connection unit 40_1 of the first layer 16_1 of the decoder 16 may add none of data to a query $q_{M1}$ (=query 26_1).

The similarity calculator 41_n executes a similarity operation, based on the query $q'_{Mn}$ and key $k_{Dn}$ (=key 24_n). The similarity operation in the similarity calculator 41_n is a dot-product process, like the similarity operation in the similarity calculator 33_n. An attention weight computed by the similarity calculator 41_n is sent to the weighted sum calculator 42_n.

The weighted sum calculator 42_n executes a weighted sum operation, based on the value $v_{Dn}$ (=value 25_n) and the attention weight received from the similarity calculator 41_n. By the weighted sum operation, an element of the value $V_{Dn}$, which corresponds to the key $k_{Dn}$ that is similar to the query $q'_{Mn}$, is extracted. An output from the weighted sum calculator 42_n is sent to the residual connection unit 43_n.

Note that the attention operation in the n-th layer 16_n of the decoder 16 is expressed by the following equation (3).

$$\text{Attention}(q'_{Mn}, k_{Dn}, v_{Dn}) = \text{Softmax}(q'_{Mn} \cdot k_{Dn}^T / \sqrt{d}) \cdot v_{Dn} \quad (3)$$

Here, the key $k_{Dn}$ and the value $v_{Dn}$ are generated based on the knowledge source 21. The query $q'_{Mn}$ is generated based on the question 22 or the re-question 22R. Thus, the attention operation in the n-th layer 16_n is a source-target attention.

The residual connection unit 43_n executes a residual connection by adding the data 23_(n−1) to the output from the weighted sum calculator 42_n.

The normalization unit 44_n executes a layer normalization on an output from the residual connection unit 43_n. An output from the normalization unit 44_n becomes an output from the source-target attention sub-layer STA_n.

The feed-forward network 45n executes a multiply-accumulate operation on the output from the source-target attention sub-layer STA_n, by using a weight tensor and a bias term. The weight tensor and bias term are parameters for determining a characteristics of the n-th layer 16_n. In the present embodiment, it is assumed that the weight tensor and bias term in all feed-forward networks in the decoder 16 are determined by a training operation to be described below. Hereinafter, the parameters of all feed-forward networks in the decoder 16 are comprehensively referred to also as "learning model".

The feed-forward network 45_n includes, for example, one hidden layer. Assuming that the data output from the source-target attention sub-layer STA_n is $x_n$, the weight tensors are $W_A$ and $W_B$, and the bias terms are $b_A$ and $b_B$, an output FFN($x_n$) from the feed-forward network 45_n is expressed by the following equation (4).

$$\text{FFN}(x_n) = \text{gelu}(x_n W_A + b_A) W_B + b_B \quad (4)$$

The residual connection unit 46_n executes a residual connection by adding the output $x_n$ from the source-target attention sub-layer STA_n to the output FFN($x_n$) from the feed-forward network 45_n.

The normalization unit 47_n executes a layer normalization on an output from the residual connection unit 46_n. An output from the normalization unit 47_n becomes an output of the neural network sub-layer NL2_n. The output of the neural network sub-layer NL2_n is sent as data 23_n to an (n+1)-th layer 16_(n+1) of the decoder 16.

By the above, the n-th layer 16_n of the decoder 16 generates the data 23_n, based on the data 23_(n−1), and sends the data 23_n to the (n+1)-th layer 16_(n+1) of the decoder 16.

1.2 Operations

The operations of the embodiment will be described.

1.2.1 Inference Preparation Operation

To begin with, an inference preparation operation in the information processing device 1 according to the embodiment is described.

The inference preparation operation is an operation for causing the storage 13 to store the key 24 and value 25. The inference preparation operation is executed before an inference operation.

Figure 9:
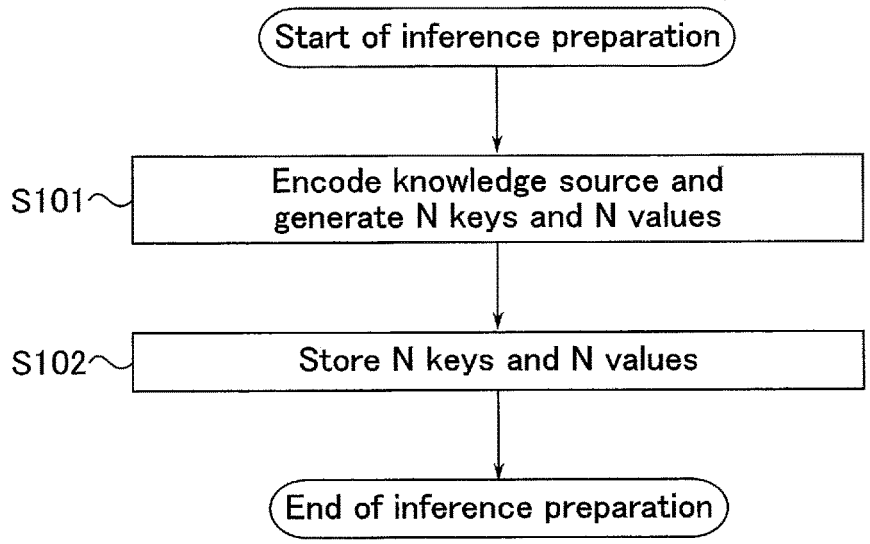
FIG. 9 is a flowchart illustrating an example of an inference preparation operation in the information processing device according to the embodiment.

FIG. 9 is a flowchart illustrating an example of the inference preparation operation in the information processing device according to the embodiment.

As illustrated in FIG. 9, when the knowledge source 21 is input ("start"), the encoder 15 encodes the knowledge source 21, and generates an N-number of keys 24_1 to 24_N, and an N-number of values 25_1 to 25_N (S101).

The encoder 15 causes the storage 13 to store the generated N keys 14_1 to 24_N and N values 25_1 to 25_N (S102).

When the process of S102 is finished, the inference preparation operation ends ("end").

1.2.2 Inference Operation

Next, an inference operation in the information processing device 1 according to the embodiment will be described.

Figure 10:
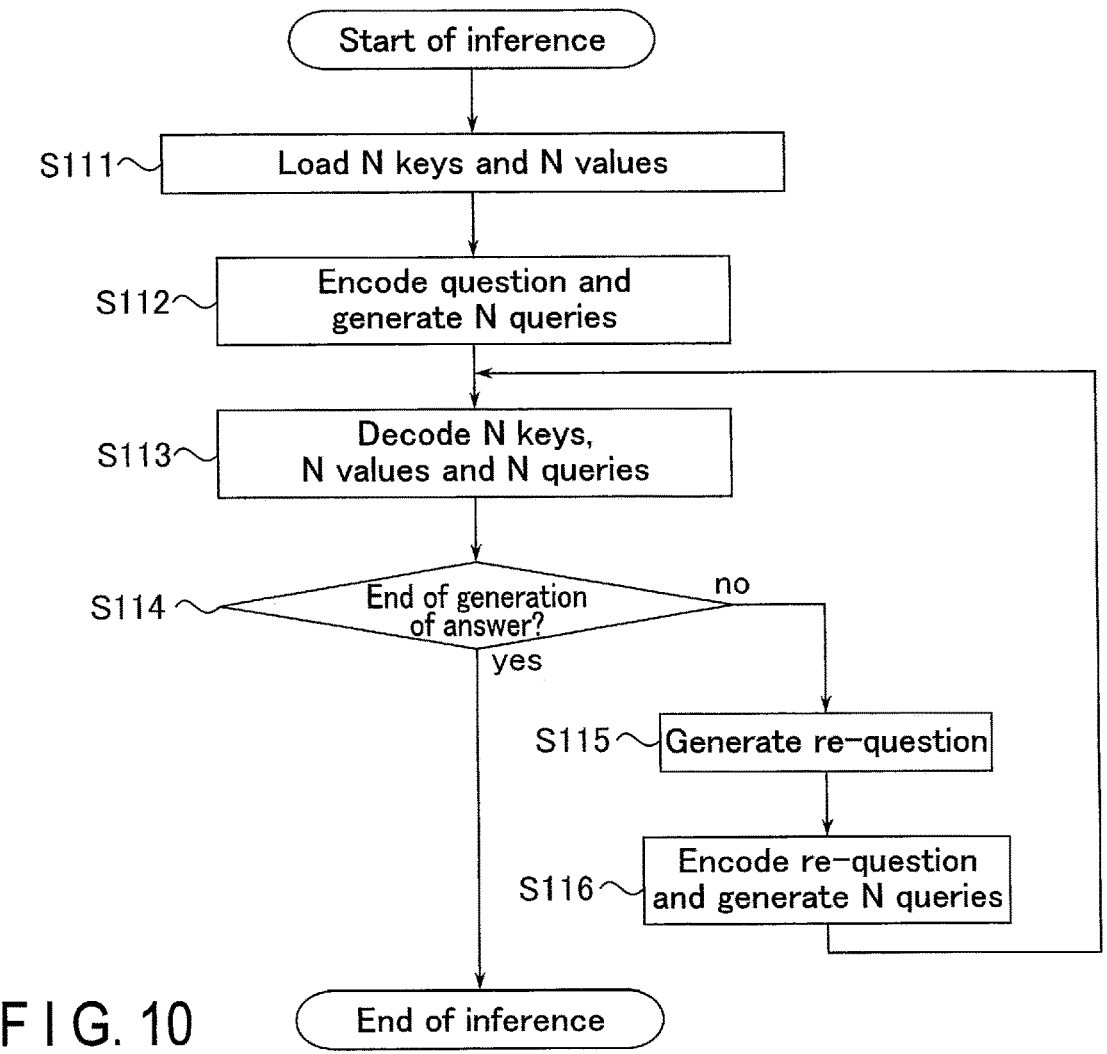
FIG. 10 is a flowchart illustrating an example of an inference operation in the information processing device according to the embodiment.

FIG. 10 is a flowchart illustrating an example of the inference operation in the information processing device according to the embodiment.

As illustrated in FIG. 10, when the question 22 is input ("start"), the decoder 16 loads the N keys 24_1 to 24_N and the N values 25_1 to 25_N which are stored in the storage 13 in the inference preparation operation (S111).

The encoder 15 encodes the question 22, and generates an N-number of queries 26_1 to 26_N (S112). The encoder 15 sends the generated N queries 26_1 to 26N to the decoder 16.

The decoder 16 generates data 23_N, which corresponds to the question 22, as a result of decoding process using the N keys 24_1 to 24_N and N values 25_1 to 25_N loaded in the process of S111, and the N queries 26_1 to 26_N generated in the process of S112 (S113).

The determination unit 16_e of the decoder 16 determines, based on the data 23_N, whether the process for generating an answer 23 is finished or not (S114). Specifically, the determination unit 16_e determines whether a token corresponding to the data 23_N is a special token </s>. The special token </s> is a token indicative of the end of a sentence. When the token corresponding to the data 23_N is not the special token </s>, the determination unit 16_e determines that the process for generating the answer 23 is not finished. When the token corresponding to the data 23_N is the special token </s>, the determination unit 16_e determines that the process for generating the answer 23 is finished.

When it is determined that the process for generating the answer 23 is not finished (S114; no), the determination unit 16_e generates a re-question 22R (S115). Specifically, the determination unit 16_e generates a new re-question 22R by inserting a token corresponding to the data 23_N, immediately before a special token <mask> in the question 22 or re-question 22R that was used in the generation of the data 23_N. The determination unit 16_e sends the generated re-question 22R to the receiving unit 15_s of the encoder 15. Thereby, the encoding of the re-question 22R generated in the process of S115 is started.

The encoder 15 encodes the re-question 22R generated in the process of S115, and generates an N-number of queries 26_1 to 26_N (S116).

After the process of S116, the decoder 16 generates data 23_N, which corresponds to the re-question 22R, as a result of decoding process using the N keys 24_1 to 24_N and N values 25_1 to 25_N loaded in the process of S111, and the N queries 26_1 to 26_N generated in the process of S116 (S113). By this operation, the data 23_N is updated until it is determined in the process of S114 that the process for generating the answer 23 is finished.

When it is determined that the process for generating the answer 23 is finished (S114; yes), the determination unit 16_e generates the answer 23. Thereby, the inference operation is completed ("end").

FIG. 11 is a diagram illustrating an example of a determination process in the information processing device according to the embodiment. FIG. 11 illustrates a concrete example of loops of the determination process until determining that the process for generating the answer 23 is finished, when "Bernhard Fries was born in <mask>" was input as the question 22. In this case, it is assumed that the answer 23 to be generated is "Bernhard Fries was born in Heidelberg." Here, it is assumed that the word "Heidelberg" is composed of three sub-words (tokens) "He", "idel" and "berg".

As illustrated in FIG. 11, in a first loop, the decoder 16 generates "He" as a token corresponding to the data 23_N. The determination unit 16_e determines that the decoded result of the decoder 16 is not the special token </s>. Thus, the inference operation transitions to a second loop.

In the second loop, the determination unit 16_e generates "Bernhard Fries was born in He<mask>" as a re-question 22R. The encoder 15 encodes "Bernhard Fries was born in He<mask>". In accordance with this, the decoder 16 generates "idel" as a token corresponding to the data 23_N. The determination unit 16_e determines that the decoded result of the decoder 16 is not the special token </s>. Thus, the inference operation transitions to a third loop.

In the third loop, the determination unit 16_e generates "Bernhard Fries was born in Heidel<mask>" as a re-question 22R. The encoder 15 encodes "Bernhard Fries was born in Heidel<mask>". In accordance with this, the decoder 16 generates "berg" as a token corresponding to the data 23_N. The determination unit 16_e determines that the decoded result of the decoder 16 is not the special token </s>. Thus, the inference operation transitions to a fourth loop.

In the fourth loop, the determination unit 16_e generates "Bernhard Fries was born in Heidelberg<mask>" as a re-question 22R. The encoder 15 encodes "Bernhard Fries was born in Heidelberg<mask>". In accordance with this, the decoder 16 generates ".(period)" as a token corresponding to the data 23_N. The determination unit 16_e determines that the decoded result of the decoder 16 is not the special token </s>. Thus, the inference operation transitions to a fifth loop.

In the fifth loop, the determination unit 16_e generates "Bernhard Fries was born in Heidelberg.<mask>" as a re-question 22R. The encoder 15 encodes "Bernhard Fries was born in Heidelberg.<mask>". In accordance with this, the decoder 16 generates a special token </s> as a token corresponding to the data 23_N. The determination unit 16_e determines that the decoded result of the decoder 16 is the special token </s>. Thus, the inference operation ends in the fifth loop. As a result, the determination unit 16_e can generate "Bernhard Fries was born in Heidelberg." as the answer 23.

1.2.3 Training Operation

Next, a training operation in the information processing device 1 according to the embodiment will be described.

The training operation is an operation for generating a learning model by determining parameters in the decoder 16. The training operation is executed before the inference preparation operation and the inference operation. In the training operation, a set including a knowledge source D, a question Q and a label L is used as training data (D, Q, L). A learning model with a high answering ability can be obtained by performing a training operation with respect to a large amount of training data (D, Q, L).

The label L is a sub-word which is to be answered by the decoder 16. Specifically, the label L corresponds to one token. The question Q is a sentence in which the token corresponding to the label L is masked by the special token <mask>. In the question Q, the special token <mask> is positioned at the end of the sentence. The knowledge source D includes at least two sentences, namely, a sentence including information for deriving a label L from the question Q, and a sentence including information which is unnecessary for deriving a label L from the question Q.

Note that, in the description below, a case is described where the training operation is executed by the information processing device 1, but the embodiment is not limited to this. Specifically, it suffices that the training operation is executed on a hardware configuration functioning as the encoder 15 and decoder 16, and may not necessarily be executed on the same hardware configuration as the information processing device 1. When the training operation is executed on a hardware configuration different from the information processing device 1, the configuration corresponding to the control circuit 11 may include a processor (e.g. a TPU: Tensor Processing Unit) which can execute operations at a higher speed than the control circuit 11. When the training operation is executed on a hardware configuration different from the hardware configuration illustrated in FIG. 1, a learning model generated by the training operation is stored, where necessary, into the memory 12 or storage 13 in the information processing device 1.

(Flowchart)

Figure 12:
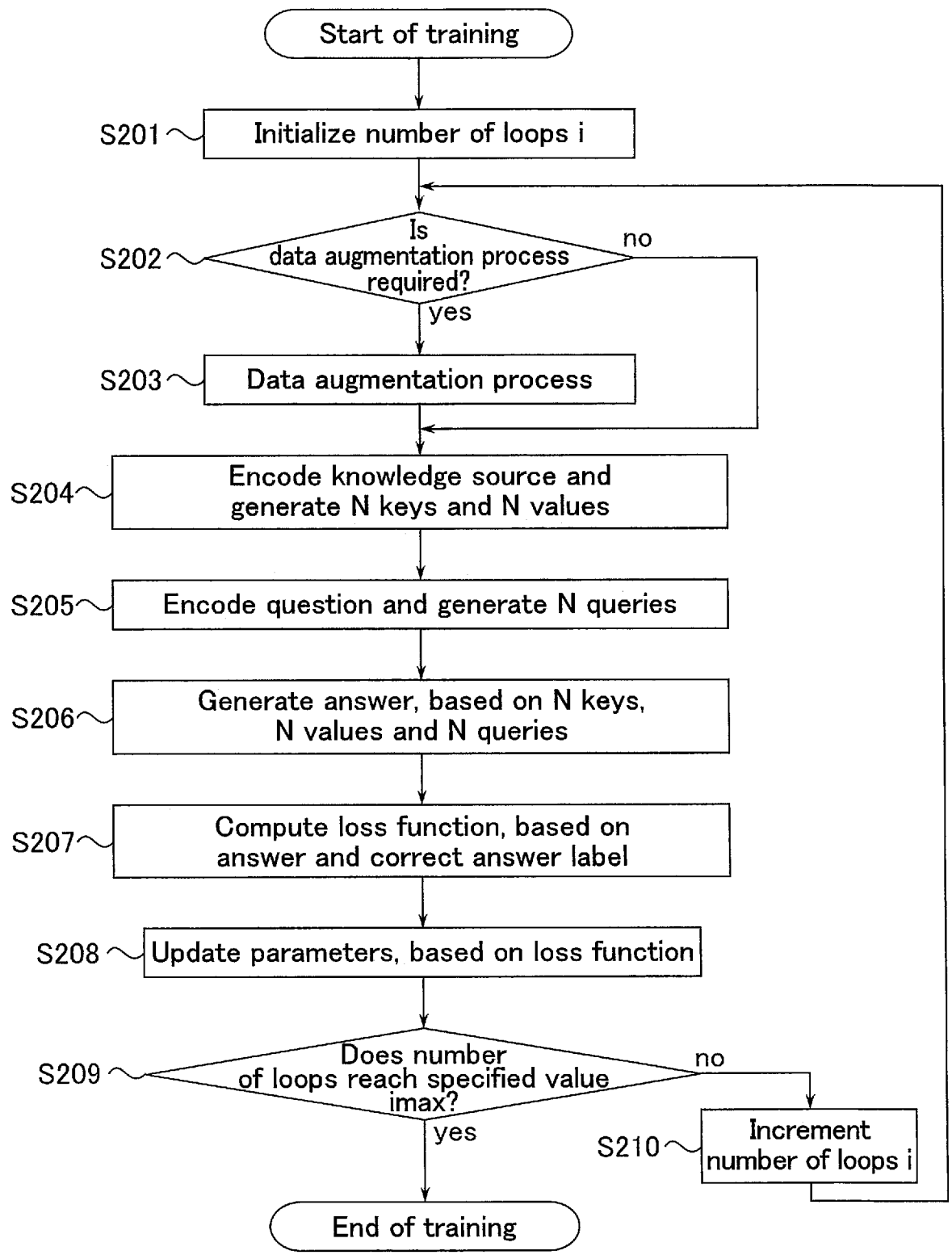
FIG. 12 is a flowchart illustrating an example of a training operation in the information processing device according to the embodiment.

FIG. 12 is a flowchart illustrating an example of the training operation in the information processing device according to the embodiment. FIG. 12 illustrates an example of the training operation using one set including training data (D, Q, L).

As illustrated in FIG. 12, when the training data (D, Q, L) is input ("start"), the control circuit 11 initializes the number of loops i to, for example, 1 (S201). The number of loops i is an integer which is 1 or more, and is a specified value imax or less. The specified value imax is the maximum number of loops which are executed on one set including training data (D, Q, L).

The control circuit 11 determines whether a data augmentation process is required or not (S202). The data augmentation process is a method for increasing the number of training data in a pseudo-manner when the number of training data is small. The control circuit 11 may stochastically determine whether the data augmentation process is to be executed or not. For example, the control circuit 11 may determine that the data augmentation process is to be executed at a probability of 50% in the loops of the specified value imax.

When it is determined that the data augmentation process is executed (S202; yes), the control circuit 11 executes the data augmentation process (S203). Thereby, in the process of the loop number i, training data (D', Q, L') that is expanded in a pseudo-manner is used in place of the training data (D, Q, L). The details of the data augmentation process will be described later. When it is determined that the data augmentation process is not executed (S202; no), the process of S203 is skipped in the process of the number of loops i.

The encoder 15 encodes the knowledge source D or D', and generates N keys $k_{D1}$ to $k_{DN}$, and N values $v_{D1}$ to $v_{Dn}$ (S204).

The encoder 15 encodes the question Q, and generates N queries $q_{M1}$ to $q_{Mn}$ (S205).

The decoder 16 generates an answer A, based on the N keys $k_{D1}$ to $k_{DN}$, N values $v_{D1}$, to $v_{DN}$, and N queries $q_{M1}$ to $q_{MN}$, which are generated in the processes of S204 and S205 (S206). The answer A is one token corresponding to the label L. Note that, at the time of the training operation, the determination unit 16_e generates the answer A, without determining whether the process for generating the answer A is finished or not. In short, the determination unit 16_e does not generate the re-question 22R.

The control circuit 11 computes a loss function, based on the answer A generated in the process of S206 and the label L (S207). For example, a cross-entropy loss is used for the loss function.

The control circuit 11 updates parameters of at least one of the feed-forward networks in the decoder 16 (S208). For example, back propagation is used for the update of the parameters.

The control circuit 11 determines whether the number of loops i reaches the specified value imax (S209).

When the number of loops i does not reach the specified value imax (S209; no), the control circuit 11 increments the number of loops i (S210). After incrementing the number of loops i, the control circuit 11 executes the process of S202 to S209 once again. In this manner, until the number of loops i reaches the specified value imax, the parameter update based on the training data (D, Q, L) or (D', Q, L') is repeatedly executed.

When the number of loops i reaches the specified value imax (S209; yes), the training operation finishes ("end").

Note that, as described above, in the training operation, the decoder 16 does not generate the re-question 22R. Thus, the training operation on the assumption of each loop in the inference operation is individually executed. Concretely, for example, in order to generate an answer "Nico Gardener was born in Riga." to a question "Nico Gardener was born in <mask>", the following four training data (1) to (4) are individually prepared. Here, it is assumed that the word "Riga" is composed of two sub-words (tokens), "R" and "iga".

(1): (Q, L)=("Nico Gardener was born in <mask>", "R")
(2): (Q, L)=("Nico Gardener was born in R<mask>", "iga")
(3): (Q, L)=("Nico Gardener was born in Riga<mask>", ".(period)")
(4): (Q, L)=("Nico Gardener was born in Riga.<mask>", "</s>")

The training operations using these four training data (1) to (4) do not need to be executed successively. Note that the training data (1) to (4) can use the common knowledge source D.

Thereby, the state corresponding to each loop in the inference operation can independently be trained. Accordingly, training with high versatility in use, which does not depend on a preceding or subsequent loop, can be performed.

(Data Augmentation Process)

Next, a data augmentation process in the information processing device 1 according to the embodiment will be described. FIG. 13 is a diagram illustrating an example of training data used by the data augmentation process in the information processing device according to the embodiment.

In the example of FIG. 13, when the data augmentation process is not executed, "Nico Gardener (1908-1989) was a British international bridge player born in Riga Latvia (then part of Imperial Russia)." is input to the encoder 15 as the knowledge source D. In addition, "Nico Gardener was born in <mask>" is input to the encoder 15 as the question Q. The correct place name to this question is "Riga".

On the other hand, when the data augmentation process is executed, the same question Q as in a case where the data augmentation process is not executed is input to the encoder 15, and an knowledge source D' different from the knowledge source D is input. The knowledge source D' is generated by replacing the place name ("Riga") of that part of the knowledge source D, which agrees with the correct place name, with other place names ("Heidelberg", "Lyon", "Hawaii", . . . ) at random. At this time, the label L is also replaced with a label L' of the place name after replacement ("Heidelberg", "Lyon", "Hawaii", . . . ).

Note that the training operation does not aim at learning facts, but aims at training a method of deriving the label L corresponding to the question Q from the knowledge source D. Thus, by the replacement of the token in the data augmentation process, the knowledge source D' may have an incorrect content that is not the fact. Accordingly, a greater amount of training data can be prepared from a less number of data sets.

1.3. Advantageous Effects of the Present Embodiment

According to the embodiment, the N layers 15_1 to 15_N of the encoder 15 generate, based on the knowledge source 21, the set including the key 24_1 and value 25_1 through the set including the key 24_N and value 25_N, respectively. The N layers 15_1 to 15_N generate the queries 26_1 to 26_N, based on the question 22. The decoder 16 generates the data 23_N, based on the keys 24_1 to 24_N, values 25_1 to 25_N, and queries 26_1 to 26_N. Thereby, when generating the answer 23, the decoder 16 can use the information generated by the N layers 15_1 to 15_N of the encoder 15. Thus, the answer accuracy in the inference operation can be improved, compared to a method (e.g. Dual-Encoder method) of using only the output of the last layer of the encoder 15.

If a supplementary description is given, the values of the key 24, value 25 and query 26 generated by the encoder 15 are different among the N layers 15_1 to 15_N. This indicates that the information included in the key 24, value 25 and query 26 is different among the layers of the generation thereof. Specifically, the keys 24_1 to 24_(N-1), values 25_1 to 25_(N-1) and queries 26_1 to 26_(N-1) may include information which is not included in the key 24_N, value 25_N and query 26_N. Here, the information, which is input from the encoder 15 to the decoder 16, is knowledge which is obtained from the context of the knowledge source 21. Concretely, for example, knowledge includes a relationship between two place names (e.g. such a relationship that two place names are a country name and a capital name of the country). On the other hand, although the decoder 16 can learn a method of generating the answer 23 to the question 22 by the training operation, the above-described knowledge cannot be learned by the decoder 16 as a single unit.

According to the present embodiment, the decoder 16 executes the inference operation by using the information from the N layers 15_1 to 15_N of the encoder 15. Thereby, the decoder 16 can generate the answer 23, while making maximum use of the knowledge collected from the knowledge source 21 by the encoder 15. Thus, the answer accuracy in the inference operation can be improved.

In addition, the encoder 15 executes, independently, the generation of the key 24 and value 25, and the generation of the query 26. Thereby, when generating the answer 23, the key 24 and value 25 can be loaded from the storage 13. Thus, when generating the answer 23, the computation load necessary for generating the key 24 and value 25 can be omitted. Accordingly, the load necessary for extracting knowledge from the knowledge source 21 can be reduced.

Figure 14:
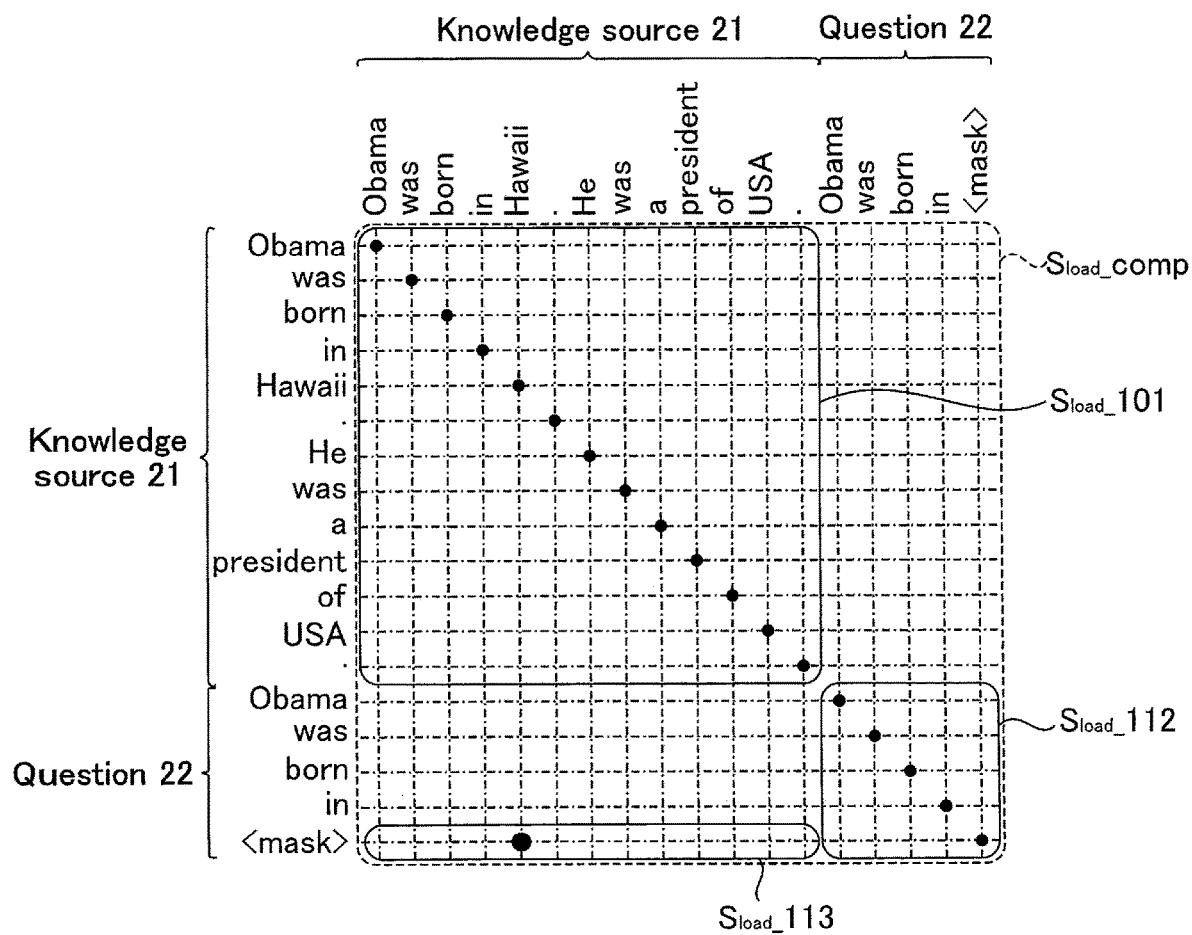
FIG. 14 is a diagram illustrating an example of a computation amount that is needed for the inference operation in the information processing device according to the embodiment.

The above-described advantageous effects will supplementally be described with reference to FIG. 14. FIG. 14 is a diagram illustrating an example of a computation amount that is needed for the inference operation in the information processing device according to the embodiment. In the example illustrated in FIG. 14, "Obama was born in Hawaii. He was a president of USA." is input as the knowledge source 21, and "Obama was born in <mask>" is input as the question 22. In addition, in FIG. 14, the computation amount needed for the inference operation is expressed by the size of the area determined by token sequences arranged in the vertical and horizontal directions on the drawing sheet.

In the computation amount by the encoder 15 and decoder 16, the computation amount of the source-target attention and self-attention is dominant. In a case of a method (e.g. BERT method) of encoding batchwise the knowledge source and the question in the encoder, the computation amount becomes O((the number of tokens in the knowledge source+ _number of tokens in the question)^2). The computation amount becomes O((the number of tokens in the knowledge source+the number of tokens in the question)^2) corresponds to an area $S_{load}$_comp in FIG. 14.

By contrast, according to the present embodiment, the computation amount of the encoder 15 becomes O(the number of tokens in the knowledge source 21)^2+O(the number of tokens in the question 22)^2. The computation amount O(the number of tokens in the knowledge source 21)^2 is the computation amount necessary for the process of S101 in FIG. 9, and corresponds to an area $S_{load}$_101 in FIG. 14. The computation amount O(the number of tokens in the question 22)^2 is the computation amount necessary for the process of S112 in FIG. 10, and corresponds to an area $S_{load}$_112 in FIG. 14. Besides, the computation amount of the decoder 16 is O(the number of tokens in the knowledge source 21). The computation amount O(the number of tokens in the knowledge source 21) is the computation amount necessary for the process of S113 in FIG. 10, and corresponds to an area. $S_{load}$_113 in FIG. 14.

In this manner, according to the present embodiment, the computation amount can be reduced, compared to the method of encoding batchwise the knowledge source and the question in the encoder. Furthermore, among the processes in the present embodiment, the process relating to the knowledge source 21 can be completed in advance before the inference operation. Thereby, the above-described computation amount O(the number of tokens in the knowledge source 21)^2 can be omitted at the time of the inference operation. Specifically, the computation amount in the inference operation can be substantially reduced to O(the number of tokens in the question 22)^2+O(the number of tokens in the knowledge source 21). Thus, the requirement for the computation performance of the control circuit 11 can be reduced.

2. Modifications and Others

Note that the above-described embodiment can variously be modified.

2.1 First Modification

For example, in the above embodiment, a case was described where the knowledge source 21 and the question 22 are encoded by one encoder 15, but the embodiment is not limited to this. For example, the knowledge source 21 and the question 22 may be encoded by different encoders.

FIG. 15 is a block diagram illustrating an example of a functional configuration of an information processing device according to a first modification. As illustrated in FIG. 15, an information processing device 1a according to the first modification may include encoders 15-1 and 15-2.

The encoder 15-1 includes the same functional configuration as illustrated in FIG. 3 and FIG. 4 in the embodiment. Specifically, the encoder 15-1 generates the key 24 and value 25, based on the knowledge source 21. The encoder 15-1 causes the storage 13 to store the generated key 24 and value 25. The encoder 15-1 has the configuration of N layers. In other words, the encoder 15-1 generates N keys 24-1 to 24-N, and N values 25-1 to 25-N. The number of dimensions of each of the keys 24-1 to 24-N generated by the encoder 15-1 is d.

The encoder 15-2 includes the same functional configuration as illustrated in FIG. 5 and FIG. 6 in the embodiment. Specifically, the encoder 15-2 generates the query 26, based on the question 22 or re-question 22R. The encoder 15-2 sends the generated query 26 to the decoder 16. The encoder 15-2 has the configuration of N layers. In other words, the encoder 15-2 generates N queries 26-1 to 26-N. The number of dimensions of each of the queries 26-1 to 26-N generated by the encoder 15-2 is d.

In this manner, the encoders 15-1 and 15-2 are configured to generate the keys 24 and queries 26 of the identical number of dimensions d, respectively. On the other hand, the parameters set in the feed-forward network in the encoder 15-1 and the parameters set in the feed-forward network in the encoder 15-2 may be identical or different. When the parameters set in the feed-forward network in the encoder 15-1 and the parameters set in the feed-forward network in the encoder 15-2 are identical, the encoders 15-1 and 15-2 generate identical keys, queries and values, based on identical inputs. When the parameters set in the feed-forward network in the encoder 15-1 and the parameters set in the feed-forward network in the encoder 15-2 are different, the encoders 15-1 and 15-2 generate mutually different keys, queries and values, based on identical inputs.

Figure 16:
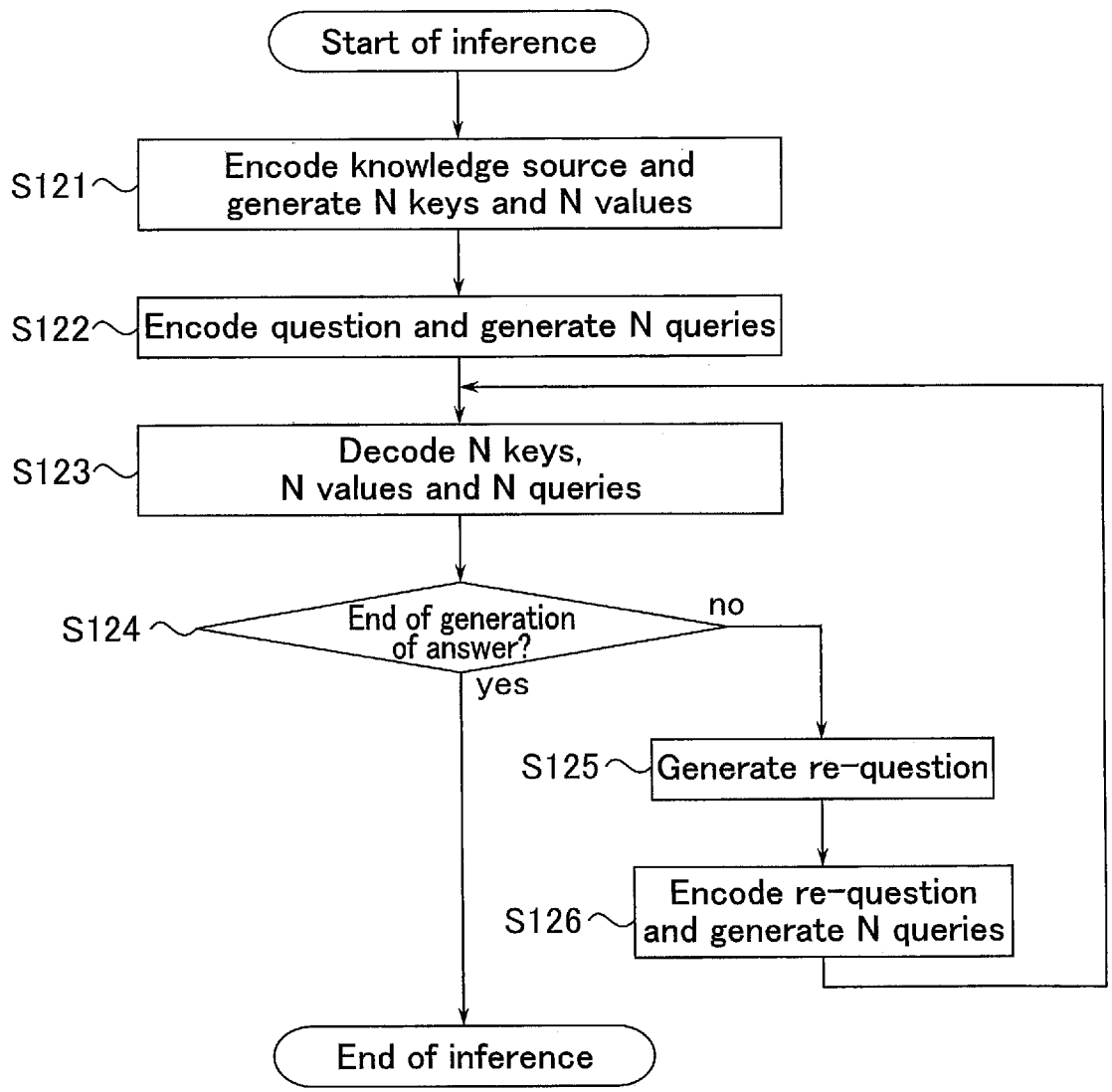
FIG. 16 is a flowchart illustrating an example of an inference operation in the information processing device according to the first modification.

FIG. 16 is a flowchart illustrating an example of an inference operation in the information processing device according to the first modification. FIG. 16 corresponds to FIG. 9 and FIG. 10 in the embodiment.

As illustrated in FIG. 16, when the question 22 is input ("start"), the encoder 15-1 encodes the knowledge source 21, and generates N keys 24_1 to 24_N and N values 25_1 to 25_N (121). The encoder 15-1 sends the generated N keys 24_1 to 24_N and N values 25_1 to 25_N to the decoder 16.

The encoder 15-2 encodes the question 22, and generates N queries 26_1 to 26_N (S122). The encoder 15-2 sends the generated N queries 26_1 to 26_N to the decoder 16.

The processes of S121 and S122 can be executed in parallel.

The decoder 16 generates data 23_N corresponding to the question 22 as a result of decoding process using the N keys 24_1 to 24_N and N values 25_1 to 25_N generated in the process of S121, and the N queries 26_1 to 26_N generated in the process of S122 (S123).

The processes of S124 to S126 are the same as the processes of S114 to S116 in FIG. 10. Specifically, after the processes of S124 to S126, the decoder 16 generates data 23_N corresponding to the re-question 22R as a result of decoding process using the N keys 24_1 to 24_N and N values 25_1 to 25_N generated in the process of S121, and the N queries 26_1 to 26_N which are generated by in the process of S126 and are based on the re-question 22R (S123). Thereby, the data 23_N is updated until determining in the process of S124 that the process for generating the answer 23 is finished.

When it is determined that the process for generating the answer 23 is finished (S124; yes), the determination unit 16_e of the decoder 16 generates the answer 23. Thereby, the inference operation is completed ("end").

According to the first modification, the key 24 and value 25, and the query 26 are generated by the different encoders 15-1 and 15-2, respectively. Thereby, at the time of the inference operation, the generation of the key 24 and value 25 and the generation of the query 26 can be executed in parallel. Thus, without the execution of the inference preparation operation, the generation time of the key 24 and value 25 can be shortened.

2.2 Second Modification

In addition, for example, in the above-described embodiment, a case was described where, in the $n$-th layer 16_$n$ of the decoder 16, the residual connection for the query 26_$n$ that adds the data 23_(n−1) from the (n−1)-th layer 16_(n−1) of the decoder 16 to the query 26_$n$ is executed, but the embodiment is not limited to this. In the $n$-th layer 16_$n$ of the decoder 16, the residual connection for the query 26_$n$ may not be executed.

Figure 17:
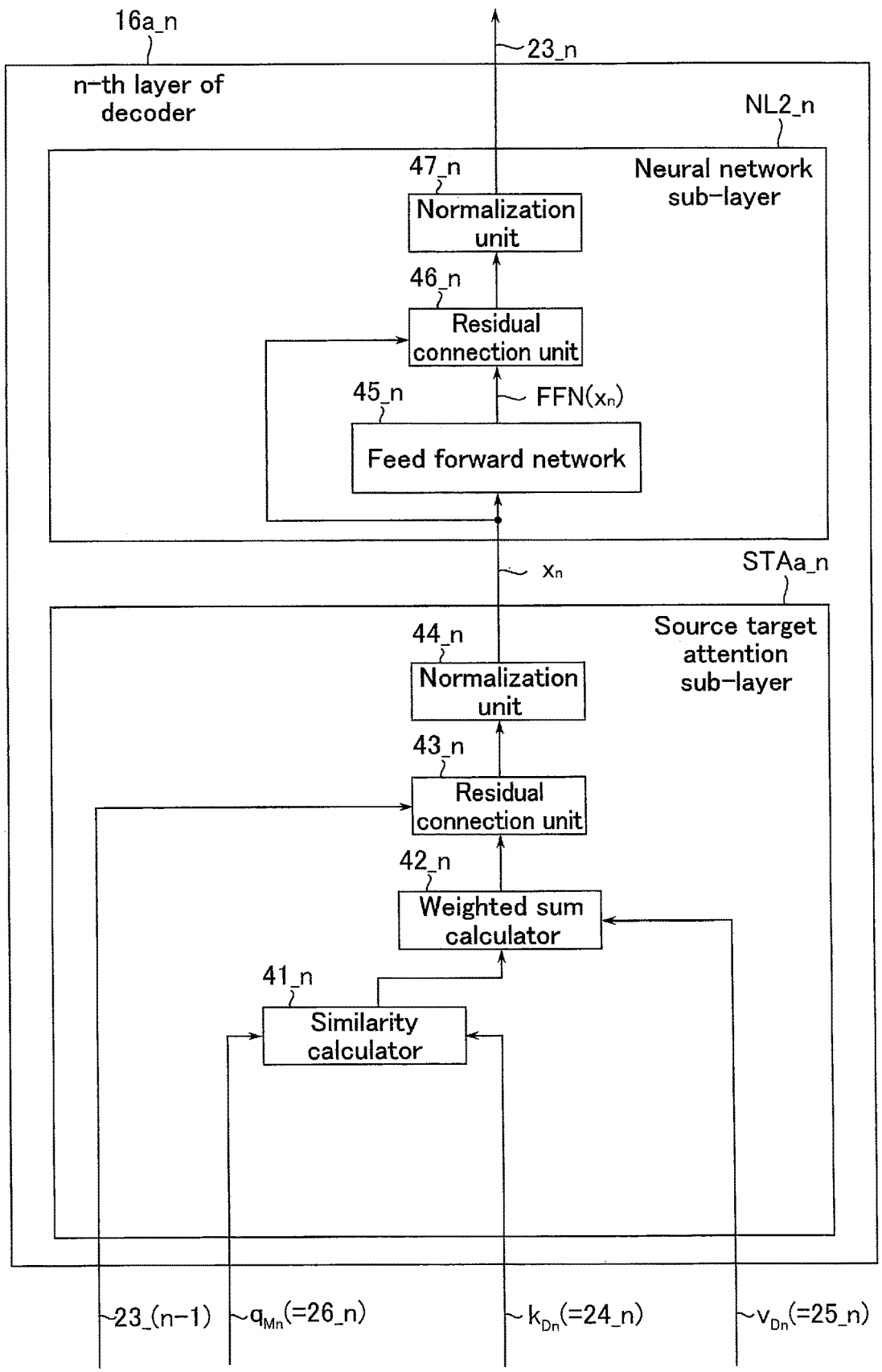
FIG. 17 is a block diagram illustrating an example of a functional configuration of an n-th layer of a decoder according to a second modification.

FIG. 17 is a block diagram illustrating an example of a functional configuration of an $n$-th layer of a decoder according to a second modification. FIG. 17 corresponds to FIG. 8 in the embodiment. As illustrated in FIG. 17, a source-target attention sub-layer STAa_$n$ included in an $n$-th layer 16a_$n$ of a decoder 16a may not include the residual connection unit 40_$n$.

Specifically, the similarity calculator 41_$n$ executes a similarity operation, based on the query $q_{Mn}$ (=query 26_$n$) and key $k_{Dn}$ (=key 24_$n$). The attention weight computed by the similarity operation of the similarity calculator 41_$n$ is sent to the weighted sum calculator 42_$n$.

Because the configurations of the weighted sum calculator 42_$n$, residual connection unit 43_$n$, normalization unit 44_$n$, feed-forward network 45_$n$, residual connection unit 46_$n$ and normalization unit 47_$n$ are the same as those in FIG. 8, a description thereof is omitted.

By the above configuration, too, when generating the answer 23, the decoder 16a can use the information generated by the N layers 15_1 to 15_N of the encoder 15. Thus, the answer accuracy of the inference operation can be improved, compared to the method of using only the output of the last layer of the encoder 15. Therefore, the same advantageous effects as in the embodiment can be obtained.

Furthermore, in the $n$-th layer 16a_$n$, the data 23_(n−1) is not added to the query 26_$n$ by the residual connection. Thus, the computation amount in the decoder 16a is reduced. Therefore, the time needed for the inference operation can be shortened.

2.3 Third Modification

In addition, for example, in the above-described embodiment, a case was described where, in the $n$-th layer 16_$n$ of the decoder 16, the residual connection for the output of the weighted sum calculator 42_$n$ that adds the data 23_(n−1) from the (n−1)-th layer 16_(n−1) of the decoder 16 to the output of the weighted sum calculator 42_$n$ is executed, but the embodiment is not limited to this. In the $n$-th layer 16_$n$ of the decoder 16, the residual connection for the output of the weighted sum calculator 42_$n$ may not be executed.

Figure 18:
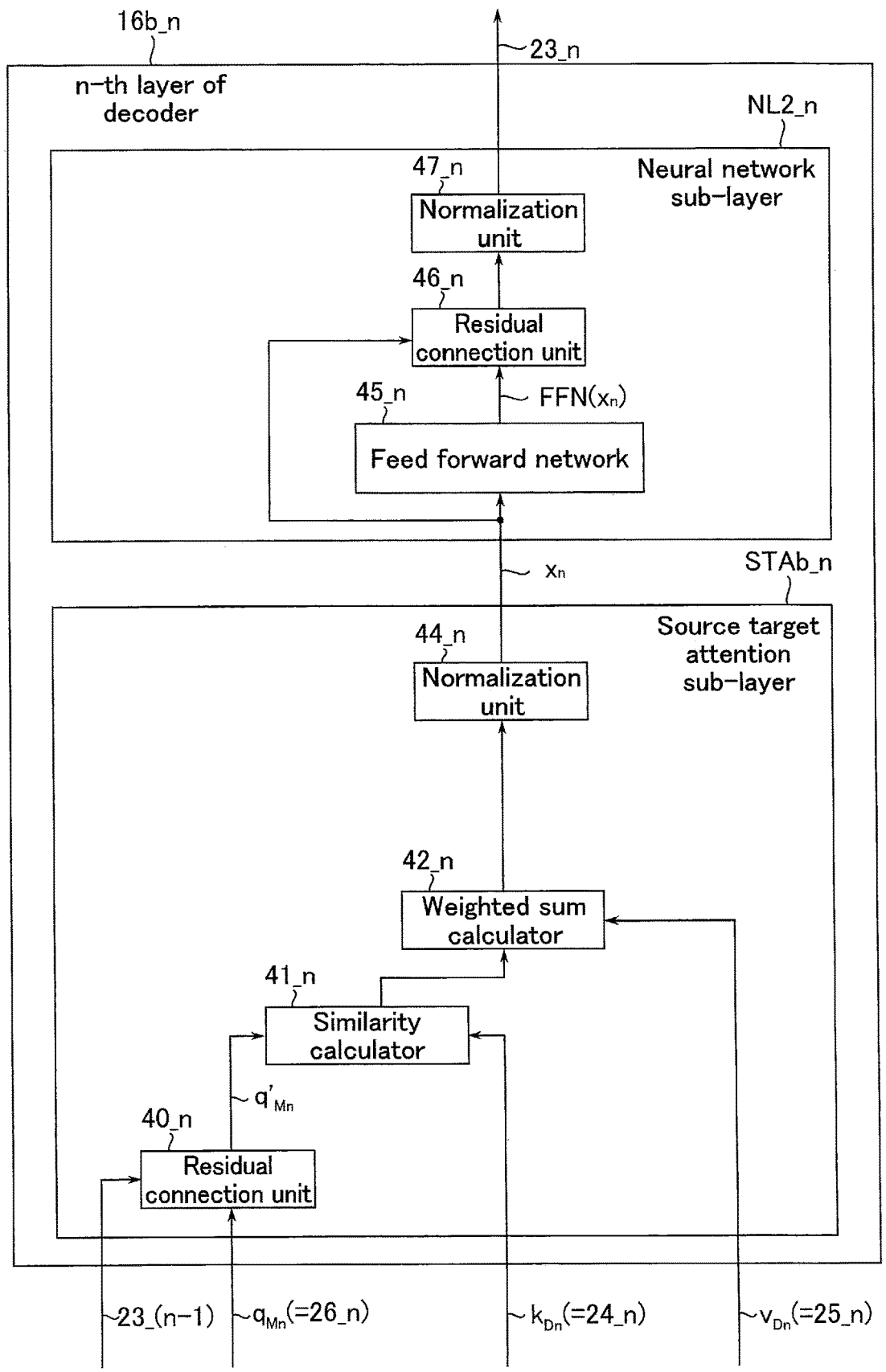
FIG. 18 is a block diagram illustrating an example of a functional configuration of an n-th layer of a decoder according to a third modification.

FIG. 18 is a block diagram illustrating an example of a functional configuration of an $n$-th layer of a decoder according to a third modification. FIG. 18 corresponds to FIG. 8 in the embodiment. As illustrated in FIG. 18, a source-target attention sub-layer STAb_$n$ included in an $n$-th layer 16b_$n$ of a decoder 16b may not include the residual connection unit 43_$n$.

Specifically, the weighted sum calculator 42_$n$ executes a weighted sum operation, based on the value $v_{Dn}$ (=value 25_$n$) and the attention weight received from the similarity calculator 41_*n*. An output from the weighted sum calculator 42_*n* is sent to the normalization unit 44_*n*.

Because the configurations of the residual connection unit 40_*n*, similarity calculator 41_*n*, normalization unit 44_*n*, feed-forward network 45_*n*, residual connection unit 46_*n* and normalization unit 47_*n* are the same as those in FIG. 8, a description thereof is omitted.

By the above configuration, too, when generating the answer 23, the decoder 16*b* can use the information generated by the N layers 15_1 to 15_N of the encoder 15. Thus, the answer accuracy of the inference operation can be improved, compared to the method of using only the output of the last layer of the encoder 15. Therefore, the same advantageous effects as in the embodiment can be obtained.

Furthermore, in the *n*-th layer 16*b*_n, the data 23_(n−1) is not added to the output of the weighted sum calculator 42_*n* by the residual connection. Thus, the computation amount in the decoder 16*b* is reduced. Therefore, the time needed for the inference operation can be shortened.

2.4 Fourth Modification

Besides, for example, in the above-described embodiment, a case was described where the N layers 16_1 to 16_N of the decoder 16 are coupled in series, and configured such that the data output from an immediately preceding layer is used, but the embodiment is not limited to this. The N layers 16_1 to 16_N of the decoder 16 may be configured such that the data output from another layer is not used.

FIG. 19 is a block diagram illustrating an example of a functional configuration of a decoder according to a fourth modification. FIG. 19 corresponds to FIG. 7 in the embodiment. As illustrated in FIG. 19, a decoder 16*c* includes an N layers 16*c*_1 to 16*c*_N in place of the N layers 16_1 to 16_N. In addition, the decoder 16*c* further includes a feed-forward network 16_*f*, in addition to the N layers 16*c*_1 to 16*c*_N and the determination unit 16_*e*.

An *n*-th layer 16*c*_*n* of the decoder 16*c* generates data 23_*n*, based on the key 24_*n*, value 25_*n* and query 26_*n*. The *n*-th layer 16*c*_*n* sends the generated data 23_*n* to the feed-forward network 16_*f*. The description relating to the *n*-th layer 16*c*_*n* of the decoder 16*c* holds true for all of the N layers of the decoder 16*c*.

The feed-forward network 16_*f* receives, as inputs, data 23_1 to 23_N which are output from the N layers 16*c*_1 to 16*c*_N, and executes a multiply-accumulate operation by using a weight tensor and a bias term. The weight tensor and bias term are parameters for determining the characteristics of the decoder 16*c*. The parameters of the feed-forward network 16_*f*, as well as all the other N feed-forward networks 45_1 to 45_N in the decoder 16*c*, are determined by the above-described training operation. An output from the feed-forward network 16_*f* is sent to the determination unit 16_*e*. Specifically, the determination unit 16_*e* processes the output from the feed-forward network 16_*f* as data equal to the data 23_N in the embodiment.

FIG. 20 is a block diagram illustrating an example of a functional configuration of an *n*-th layer of the decoder 16*c* according to the fourth modification. FIG. 20 corresponds to FIG. 8 relating to the embodiment. As illustrated in FIG. 20, a source-target attention sub-layer STAc_*n* included in an *n*-th layer 16*c*_*n* of the decoder 16*c* includes neither the residual connection unit 40_*n* nor the residual connection unit 43_*n*.

Specifically, the similarity calculator 41_*n* executes a similarity operation, based on the query $q_{Mn}$ (=query 26_*n*) and key $k_{Dn}$ (=key 24_*n*). The attention weight computed by the similarity operation of the similarity calculator 41_*n* is sent to the weighted sum calculator 42_*n*.

The weighted sum calculator 42_*n* executes a weighted sum operation, based on the value $v_{Dn}$ (=value 25_*n*) and the attention weight received from the similarity calculator 41_*n*. An output from the weighted sum calculator 42_*n* is sent to the normalization unit 44_*n*.

Since the configurations of the normalization unit 44_*n*, feed-forward network 45_*n*, residual connection unit 46_*n* and normalization unit 47_*n* are the same as those in FIG. 8, a description thereof is omitted.

By the above configuration, too, when generating the answer 23, the decoder 16 can use the information generated by the N layers 15_1 to 15N of the encoder 15. Thus, the answer accuracy of the inference operation can be improved, compared to the method of using only the output of the last layer of the encoder 15. Therefore, the same advantageous effects as in the embodiment can be obtained.

2.5 Others

In the above embodiments, for example, as illustrated in FIG. 4 and FIG. 6, a case was described where, in the *n*-th layer 15_*n* of the encoder 15, the normalization units 36_*n* and 39_*n* are provided on the rear stages of the similarity calculator 33_*n* and weighted sum calculator 34_*n*, and the feed-forward network 37_*n*, respectively, but the embodiments are not limited to this. For example, the normalization units 36_*n* and 39_*n* may be provided on the front stages of the similarity calculator 33_*n* and weighted sum calculator 34_*n*, and the feed-forward network 37_*n*, respectively. Similarly, for example, as illustrated in FIG. 8, a case was described where, in the *n*-th layer 16_*n* of the decoder 16, the normalization units 44_*n* and 47_*n* are provided on the rear stages of the similarity calculator 41_*n* and weighted sum calculator 42_*n*, and the feed-forward network 45_*n*, respectively, but the embodiments are not limited to this. For example, the normalization units 44_*n* and 47_*n* may be provided on the front stages of the similarity calculator 41_*n* and weighted sum calculator 42_*n*, and the feed-forward network 45_*n*, respectively.

Additionally, in the above embodiments, for example, as illustrated in FIG. 4, a case was described where, in the *n*-th layer 15_*n* of the encoder 15, the similarity calculator 33_*n* and the weighted sum calculator 34_*n* use batchwise the queries $q_{Dn}$, keys $k_{Dn}$ and values $v_{Dn}$ of the d dimensions in the attention operation, but the embodiments are not limited to this. For example, the similarity calculator 33_*n* and the weighted sum calculator 34_*n* may divide the queries $q_{Dn}$, keys $k_{Dn}$ and values $v_{Dn}$ of the d dimensions into an h-number of heads, and may use the heads in the attention operation (h is an integer of 2 or more). In this case, with respect to each of the h heads, each of the query $q_{Dn}$, key $k_{Dn}$ and value $v_{Dn}$ has a size of $[L_D, d/h]$. Similarly, for example, as illustrated in FIG. 8, a case was described where, in the *n*-th layer 16_*n* of the decoder 16, the similarity calculator 41_*n* and the weighted sum calculator 42_*n* use batchwise the queries $q'_{Dn}$, keys $k_{Dn}$ and values $v_{Dn}$ of the d dimensions in the attention operation, but the embodiments are not limited to this. For example, the similarity calculator 41_*n* and the weighted sum calculator 42_*n* may divide the queries $q'_{Dn}$, keys $k_{Dn}$ and values $v_{Dn}$ of the d dimensions into an h-number of heads, and may use the heads in the attention operation. In this case, with respect to each of the h heads, the query $q'_{Dn}$, key $k_{Dn}$ and value $v_{Dn}$ have sizes of $[1, d/h]$, $[L_D, d/h]$ and $[L_D, d/h]$, respectively. This attention operation is also called "multi-head attention operation". In a form including both the attention operation in the above embodiments and the multi-head attention operation, the number of dimension d in the above equations (1) to (3) is expanded to d/H (H is an integer of 1 or more).

Additionally, in the above embodiments, for example, as illustrated in FIG. 4 and FIG. 6, a case was described where, in the $n$-th layer 15_$n$ of the encoder 15, the residual connection units 35_$n$ and 38_$n$ execute the residual connection by the addition process, but the embodiments are not limited to this. For example, the residual connection units 35_$n$ and 38_$n$ may execute the residual connection by a subtraction process, a multiplication process, a concatenation process and a dot-product process. Similarly, for example, as illustrated in FIG. 8, a case was described where, in the $n$-th layer 16_$n$ of the decoder 16, the residual connection units 43_$n$ and 46_$n$ execute the residual connection by the addition process, but the embodiments are not limited to this. For example, the residual connection units 43_$n$ and 46_$n$ may execute the residual connection by a subtraction process, a multiplication process, a concatenation process and a dot-product process.

Additionally, in the above embodiments, a case was described where the decoder 16 executes the attention operation by reading out all the keys 24 and values 25 stored in the storage 13, but the embodiments are not limited to this. For example, the decoder 16 may cooperate with the memory 12, and may search that part (i.e. the part with a size of $[L_D', d]$) of the keys 24 and values 25 of the size $[L_D, d]$, which has the number of tokens $L_D'$ with a high similarity. The decoder 16 may execute the attention operation by reading out the key 24 and value 25 of the size $[L_D', d]$, which are extracted by the search. Thereby, the computation amount of the attention operation by the decoder 16 can further be reduced.

Additionally, in the above embodiments, a case was described where the encoder 15 and decoder 16 have configurations of three or more layers, but the embodiments are not limited to this. For example, the encoder 15 and decoder 16 may have configurations of two layers.

Additionally, in the above embodiments, a case was described where the question 22, in which the end of a sentence is masked, is input to the encoder 15, but the embodiments are not limited to this. For example, the question 22, in which the beginning of a sentence or an intermediate part of the sentence is masked, may be input to the encoder 15.

Additionally, in the above embodiments, a case was described where the information processing device 1 executes question answering as the inference operation, but the embodiments are not limited to this. For example, the information processing device 1 may execute reading comprehension as the inference operation.

Additionally, in the above embodiments, a case was described where the information processing device 1 converts a natural language to data in the inference operation, but the embodiments are not limited to this. For example, the information processing device 1 may convert information such as an image, which is different from a natural language, to data in the inference operation.

Note that parts or all of the above embodiments may be described as in the following supplementary notes, but are not limited to the following.

[Item 1] An information processing device including an encoder including a first layer and a second layer coupled in series; and a decoder, the encoder being configured to generate, based on first data, a first key and a first value in the first layer, and a second key and a second value in the second layer; and to generate, based on second data different from the first data, a first query in the first layer, and a second query in the second layer, and the decoder being configured to generate third data which is included in the first data and is not included in the second data, based on the first key, the first value, the first query, the second key, the second value, and the second query.

[Item 2] The information processing device of item 1, wherein the decoder includes a first attention layer, a first neural network layer, a second attention layer, and a second neural network layer, the first attention layer is configured to generate fourth data by executing a first attention operation based on the first query, the first key and the first value, the first neural network layer is configured to generate fifth data by executing a first multiply-accumulate operation based on the fourth data, the second attention layer is configured to generate sixth data by executing a second attention operation based on the second query, the second key and the second value, and the second neural network layer is configured to generate the third data by executing a second multiply-accumulate operation based on the sixth data.

[Item 3] The information processing device of item 2, wherein each of the first neural network layer and the second neural network layer is configured to use a feed-forward network.

[Item 4] The information processing device of item 2, wherein the first attention operation and the second attention operation are source-target attention operations.

[Item 5] The information processing device of item 1, wherein the encoder includes a first encoder and a second encoder, the first encoder includes a third layer and a fourth layer coupled in series, the third layer being the first layer, and the fourth layer being the second layer, the second encoder includes a fifth layer and a sixth layer coupled in series, the fifth layer being the first layer, and the sixth layer being the second layer, the first encoder is configured to generate, based on the first data, the first key and the first value in the third layer, and the second key and the second value in the fourth layer, and the second encoder is configured to generate, based on the second data, the first query in the fifth layer, and the second query in the sixth layer.

[Item 6] The information processing device of item 5, wherein the first encoder is configured to generate, based on the second data, a third query in the third layer, and a fourth query in the fourth layer, the third query is identical to the first query, and the fourth query is identical to the second query.

[Item 7] The information processing device of item 5, wherein the first encoder is configured to generate, based on the second data, a third query in the third layer, and a fourth query in the fourth layer, the third query is different from the first query, and the fourth query is different from the second query.

[Item 8] An information processing method including generating, based on first data, a first key, a first value, a second key and a second value; generating, based on second data different from the first data, a first query, and a second query; and generating third data which is included in the first data and is not included in the second data, based on the first key, the first value, the first query, the second key, the second value, and the second query.

[Item 9] The information processing method of item 8, wherein the generating the third data includes generating fourth data by executing a first attention operation based on the first query, the first key and the first value, generating fifth data by executing a first multiply-accumulate operation based on the fourth data, generating sixth data by executing a second attention operation based on the second query, the second key and the second value, and generating the third data by executing a second multiply-accumulate operation based on the sixth data.

While certain embodiments have been described, these embodiments have been presented by way of example only, and are not intended to limit the scope of the inventions. Indeed, the embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit.

What is claimed is:

1. An information processing device comprising:
an encoder including a first layer and a second layer coupled in series; and
a decoder,
the encoder being configured to:
generate, based on first data, a first key and a first value in the first layer, and a second key and a second value in the second layer; and
generate, based on second data different from the first data, a first query in the first layer, and a second query in the second layer, and
the decoder being configured to:
generate third data which is included in the first data and is not included in the second data, based on the first key, the first value, the first query, the second key, the second value, and the second query.

2. The information processing device of claim 1, wherein
the decoder includes a first attention layer, a first neural network layer, a second attention layer, and a second neural network layer,
the first attention layer is configured to generate fourth data by executing a first attention operation based on the first query, the first key and the first value,
the first neural network layer is configured to generate fifth data by executing a first multiply-accumulate operation based on the fourth data,
the second attention layer is configured to generate sixth data by executing a second attention operation based on the second query, the second key and the second value, and
the second neural network layer is configured to generate the third data by executing a second multiply-accumulate operation based on the sixth data.

3. The information processing device of claim 2, wherein
the second attention layer is configured to generate the sixth data by executing the second attention operation based on a third query based on the fifth data and the second query, the second key, and the second value.

4. The information processing device of claim 3, wherein
the second attention layer is configured to generate the third query by executing a residual connection between the fifth data and the second query.

5. The information processing device of claim 2, wherein
the second neural network layer is configured to generate the third data by executing the second multiply-accumulate operation based on seventh data based on the fifth data and the sixth data.

6. The information processing device of claim 5, wherein
the second attention layer is configured to generate the seventh data by executing a residual connection between the fifth data and the sixth data.

7. The information processing device of claim 2, wherein
the decoder further includes a third neural network layer,
the third data is independent from the fifth data, and
the third neural network layer is configured to generate eighth data by executing a third multiply-accumulate operation based on the fifth data and the third data.

8. The information processing device of claim 2, wherein
each of the first neural network layer and the second neural network layer is configured to use a feed-forward network.

9. The information processing device of claim 2, wherein
the first attention operation and the second attention operation include source-target attention operations.

10. The information processing device of claim 1, wherein
the encoder is configured to:
generate, based on the first data, the first key and the first value by executing a third attention operation in the first layer, and the second key and the second value by executing a fourth attention operation in the second layer, and
generate, based on the second data, the first query by executing a fifth attention operation in the first layer, and the second query by executing a sixth attention operation in the second layer.

11. The information processing device of claim 10, wherein
the third attention operation, the fourth attention operation, the fifth attention operation and the sixth attention operation include self-attention operations.

12. The information processing device of claim 1, further comprising:
a storage configured to correlate and nonvolatilely store the first key and the first value, and to correlate and nonvolatilely store the second key and the second value,
wherein
the decoder is configured to load the first key, the first value, the second key and the second value from the storage.

13. The information processing device of claim 1, wherein
the encoder includes a first encoder and a second encoder,
the first encoder includes a third layer and a fourth layer coupled in series, the third layer being the first layer, and the fourth layer being the second layer,
the second encoder includes a fifth layer and a sixth layer coupled in series, the fifth layer being the first layer, and the sixth layer being the second layer,
the first encoder is configured to generate, based on the first data, the first key and the first value in the third layer, and the second key and the second value in the fourth layer, and
the second encoder is configured to generate, based on the second data, the first query in the fifth layer, and the second query in the sixth layer.

14. The information processing device of claim 13, wherein
the first key, the second key, the first query and the second query each have an identical number of dimensions.

15. The information processing device of claim 13, wherein
the first encoder is configured to generate, based on the second data, a third query in the third layer, and a fourth query in the fourth layer,
the third query is identical to the first query, and
the fourth query is identical to the second query.

16. The information processing device of claim 13, wherein
the first encoder is configured to generate, based on the second data, a third query in the third layer, and a fourth query in the fourth layer,
the third query is different from the first query, and
the fourth query is different from the second query.

17. An information processing method comprising:
generating, based on first data, a first key, a first value, a second key and a second value;
generating, based on second data different from the first data, a first query, and a second query; and
generating third data which is included in the first data and is not included in the second data, based on the first key, the first value, the first query, the second key, the second value, and the second query.

18. The information processing method of claim 17, wherein
the generating the third data includes:
generating fourth data by executing a first attention operation based on the first query, the first key and the first value;
generating fifth data by executing a first multiply-accumulate operation based on the fourth data;
generating sixth data by executing a second attention operation based on the second query, the second key and the second value; and
generating the third data by executing a second multiply-accumulate operation based on the sixth data.

19. A generating method of a learning model, comprising:
generating, based on first data, a first key, a first value, a second key and a second value;
generating, based on second data different from the first data, a first query, and a second query;
generating third data which is included in the first data and is not included in the second data, based on the first key, the first value, the first query, the second key, the second value, and the second query;
computing a loss function, based on the generated third data;
updating a parameter, based on the computed loss function; and
repeating, based on the updated parameter, by a first number of times, the generating the first key, the first value, the second key and the second value, the generating the first query and the second query, the generating the third data, the computing, and the updating.

20. The generating method of claim 19, further comprising:
generating, in at least one of repetitions of the first number of times, the first key, the first value, the second key and the second value, based on data in which a part of the first data is changed, the part corresponding to the third data.

* * * * *